(12) United States Patent
Kalil

(10) Patent No.: US 8,056,914 B2
(45) Date of Patent: Nov. 15, 2011

(54) MOMENTUM MANAGEMENT IN A WHEEL SUCH AS A TRACTION WHEEL UNDER A CHANGING LOAD

(76) Inventor: Russell John Kalil, Skaneateles, NY (US)

( * ) Notice: Subject to any disclaimer, the term of this patent is extended or adjusted under 35 U.S.C. 154(b) by 946 days.

(21) Appl. No.: 11/861,998

(22) Filed: Sep. 26, 2007

(65) Prior Publication Data
US 2008/0174166 A1 Jul. 24, 2008

Related U.S. Application Data

(60) Provisional application No. 60/944,885, filed on Jun. 19, 2007, provisional application No. 60/888,204, filed on Feb. 5, 2007, provisional application No. 60/885,720, filed on Jan. 19, 2007.

(51) Int. Cl.
*B62M 1/10* (2010.01)
(52) U.S. Cl. ........ 280/217; 301/5.22; 301/5.1; 74/572.2
(58) Field of Classification Search ........... 280/217, 280/216, 212; 301/5.22, 5.1; 74/572.2
See application file for complete search history.

(56) References Cited

U.S. PATENT DOCUMENTS

| | | | |
|---|---|---|---|
| 1,706,678 A | 3/1929 | Pangburn | |
| 1,759,466 A | 5/1930 | Porter | |
| 1,831,633 A | 11/1931 | Morici | |
| 1,866,652 A | 7/1932 | Isaacson et al. | |
| 1,867,590 A | 7/1932 | Porter | |
| 1,878,727 A | 9/1932 | Sturbelle | |
| 2,196,654 A | 4/1940 | Bertran | |
| 2,301,943 A | 11/1942 | Georg | |
| 2,346,005 A | 4/1944 | Bryson | |
| 2,403,478 A | 7/1946 | Burnat | |
| 2,931,928 A | 4/1960 | Fehn | |
| 3,248,967 A | 5/1966 | Lewis | |
| 3,338,048 A | 8/1967 | Studer | |
| 3,363,472 A | 1/1968 | Quermann et al. | |
| 3,733,923 A * | 5/1973 | Goodrich et al. | 74/570.2 |
| 3,885,814 A | 5/1975 | Rizzo | |
| 3,968,593 A | 7/1976 | Lin | |
| 3,970,409 A | 7/1976 | Luchuk | |
| 4,019,396 A | 4/1977 | Frechette | |
| 4,335,627 A | 6/1982 | Maxwell | |
| 4,709,457 A | 12/1987 | Broquere et al. | |
| 4,712,806 A | 12/1987 | Patrin | |

(Continued)

OTHER PUBLICATIONS

Article on LandRider Elite from Blue Collar Mountain Biking, pp. 1 through 7, found at http://bluecollarmtb.com/2005/04/05/autoshift-technology/; printed from the World Wide Web on Oct. 26, 2007.

(Continued)

*Primary Examiner* — Paul N Dickson
*Assistant Examiner* — Marlon Acre
(74) *Attorney, Agent, or Firm* — Hiscock & Barclay, LLP

(57) ABSTRACT

A wheel, such as a traction wheel, with a momentum enhancing apparatus. The momentum enhancing apparatus may selectively enhance the wheel's ability to maintain its angular velocity at relatively high speeds, while having a reduced effect on the angular velocity of the wheel at relatively slow speeds. The momentum enhancing apparatus may include one or more bodies that either translate radially between the hub and the rim of the wheel to change the mass moment of inertia of the wheel, or rotate with the wheel and transfer the momentum of the bodies to the wheel under increasing loads. Methods of using such apparati and vehicles equipped with such apparati are also enclosed.

13 Claims, 15 Drawing Sheets

U.S. PATENT DOCUMENTS

| | | | |
|---|---|---|---|
| 4,755,006 A * | 7/1988 | Clay et al. | 301/5.22 |
| 4,926,107 A | 5/1990 | Pinson | |
| 4,928,553 A | 5/1990 | Wagner | |
| 5,048,367 A * | 9/1991 | Knowles | 301/5.22 |
| 5,083,899 A | 1/1992 | Koch | |
| 5,086,664 A | 2/1992 | Wagner | |
| 5,142,936 A * | 9/1992 | McGale | 74/570.2 |
| 5,415,245 A | 5/1995 | Hammond | |
| 5,490,436 A | 2/1996 | Coyne et al. | |
| 5,627,438 A | 5/1997 | Barrett | |
| 5,685,196 A | 11/1997 | Foster, Sr. | |
| 5,692,414 A | 12/1997 | Gregoire | |
| 5,944,637 A | 8/1999 | Stickler et al. | |
| 6,086,161 A | 7/2000 | Luttgeharm et al. | |
| 6,126,185 A | 10/2000 | Kelley et al. | |
| 6,146,297 A | 11/2000 | Kimura | |
| 6,254,203 B1 | 7/2001 | Arnold | |
| 6,523,660 B1 | 2/2003 | Chen | |
| 6,597,136 B2 | 7/2003 | Burton et al. | |
| 6,979,060 B2 * | 12/2005 | Fogal et al. | 301/5.22 |
| 6,988,974 B2 | 1/2006 | Kobayashi et al. | |
| 6,991,076 B2 | 1/2006 | McAndrews | |
| 7,101,310 B2 | 9/2006 | Smith et al. | |
| 2001/0035059 A1 | 11/2001 | Baskis et al. | |
| 2002/0104393 A1 | 8/2002 | Van Es et al. | |
| 2003/0034220 A1 | 2/2003 | Chen | |
| 2005/0164843 A1 | 7/2005 | Papadopoulos et al. | |
| 2005/0188783 A1 | 9/2005 | Stanimirovic | |
| 2006/0170169 A1 | 8/2006 | Humeau | |
| 2006/0293148 A1 | 12/2006 | Smith et al. | |
| 2010/0052408 A1 * | 3/2010 | Ren | 301/5.1 |
| 2010/0213755 A1 * | 8/2010 | Fogal et al. | 301/5.22 |

OTHER PUBLICATIONS

Product information for Landrider Deluxe Bike, pp. 1 through 5. found at http://www.lrbikes.com/LR.asp; printed from the World Wide Web on Oct. 25, 2007.

Product Preview for the Trek Lime; pp. 1 through 4, found at http://www.bikegallery.com/Trek-Lime.php; printed from the World Wide Web on Oct. 25, 2007.

Printed web page from Universal Cycles, pp. 1 through 13, found at http://bikeportland.og/wp-content/plugins/falbum/wp/album.php?show=recent&page=1 . . . printed from the World Wide Web on Oct. 25, 2007.

* cited by examiner

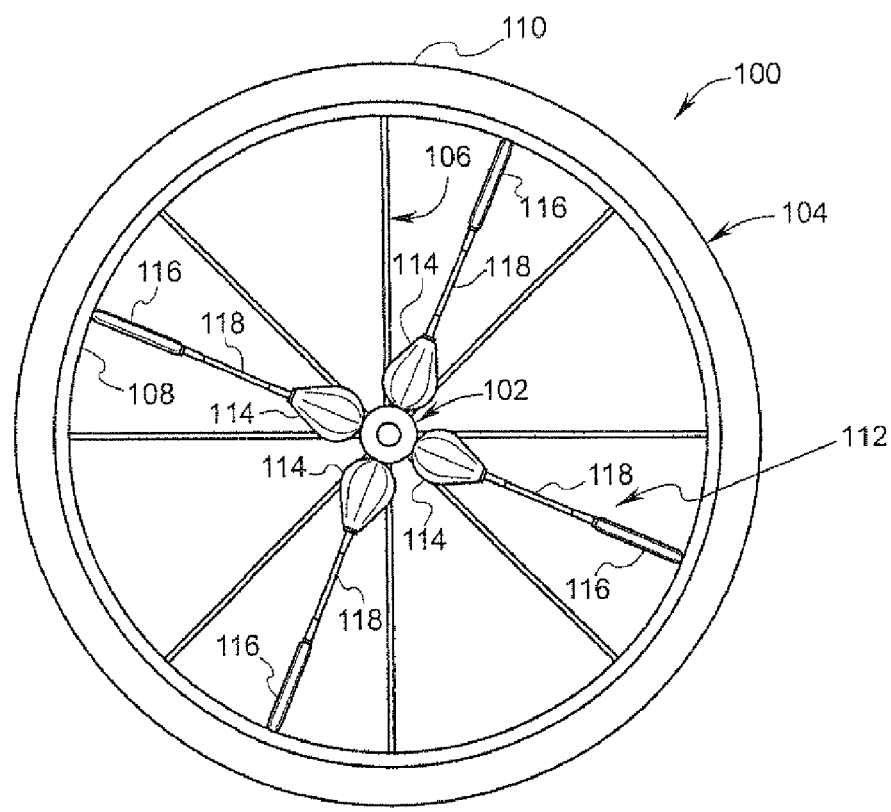
*Fig. 1*
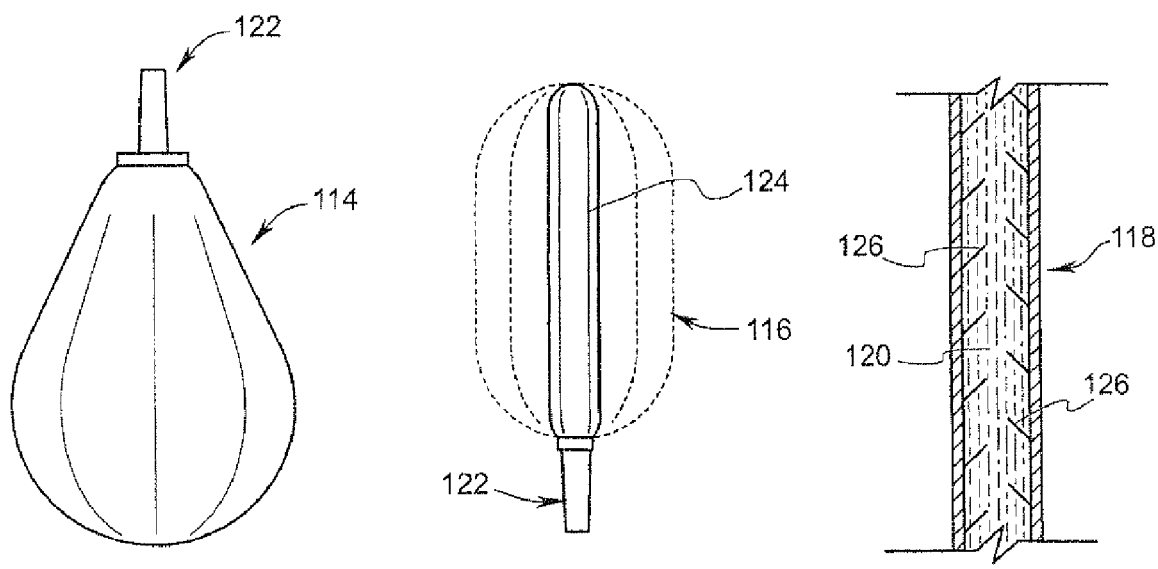
*Fig.2*     *Fig.3*     *Fig.4*

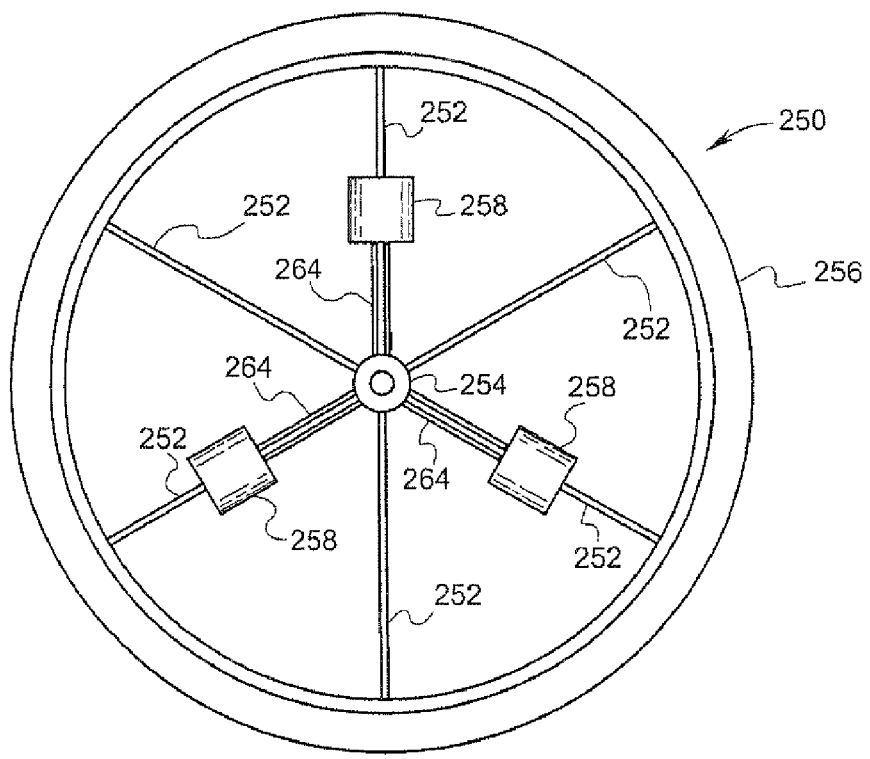
*Fig. 13C*
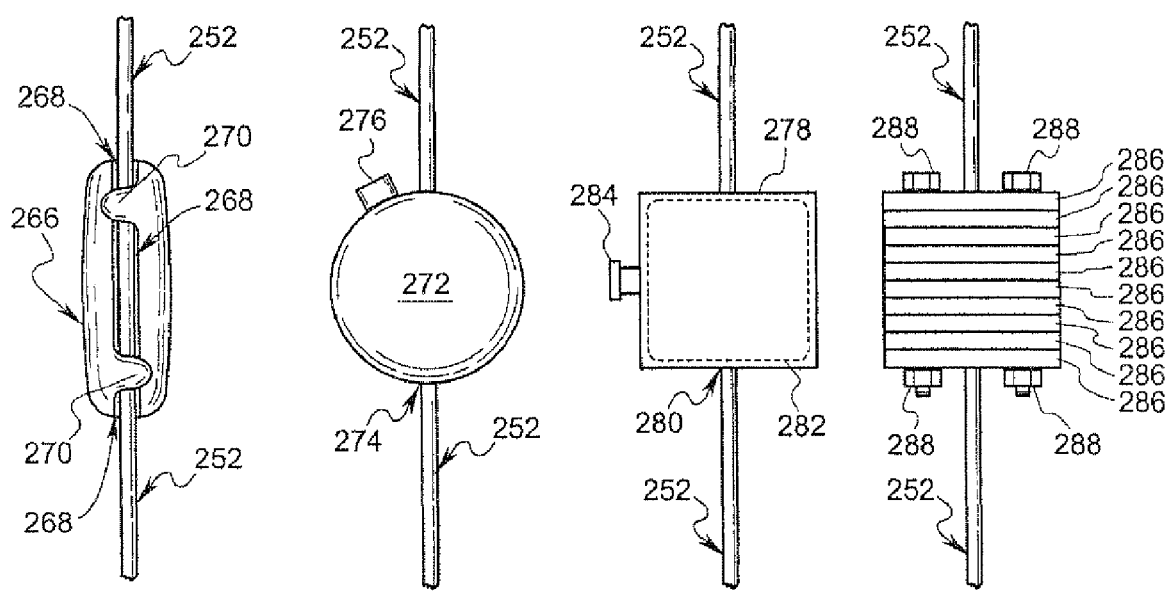
*Fig. 13D*  *Fig. 13E*  *Fig. 13F*  *Fig. 13G*

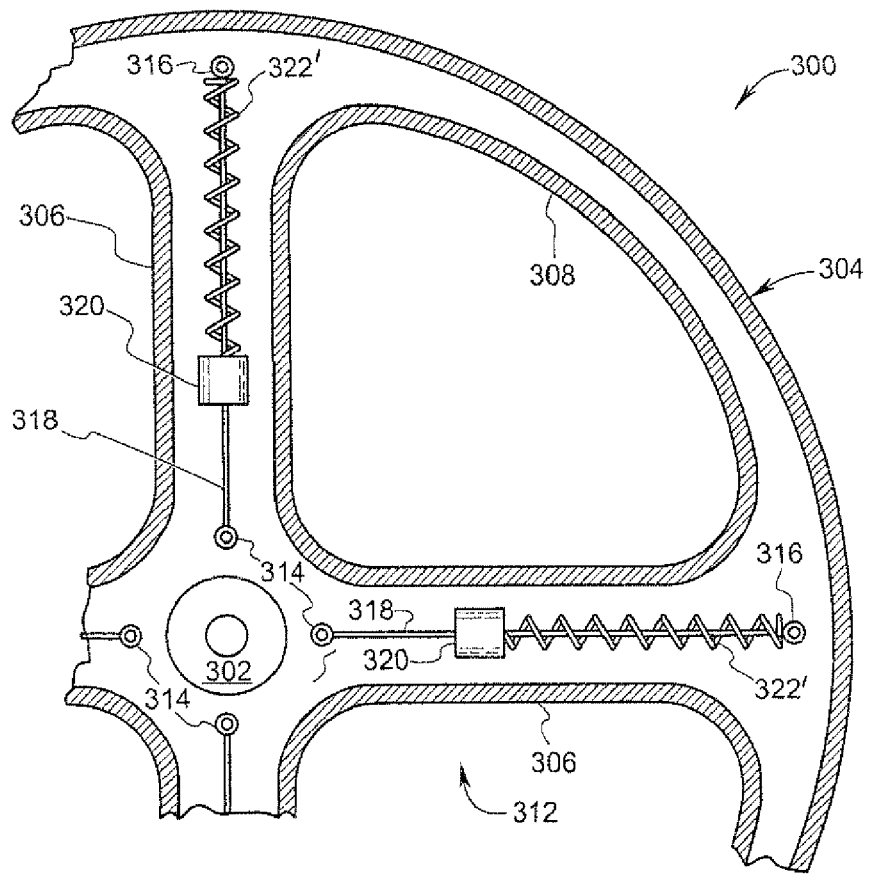
*Fig. 15*
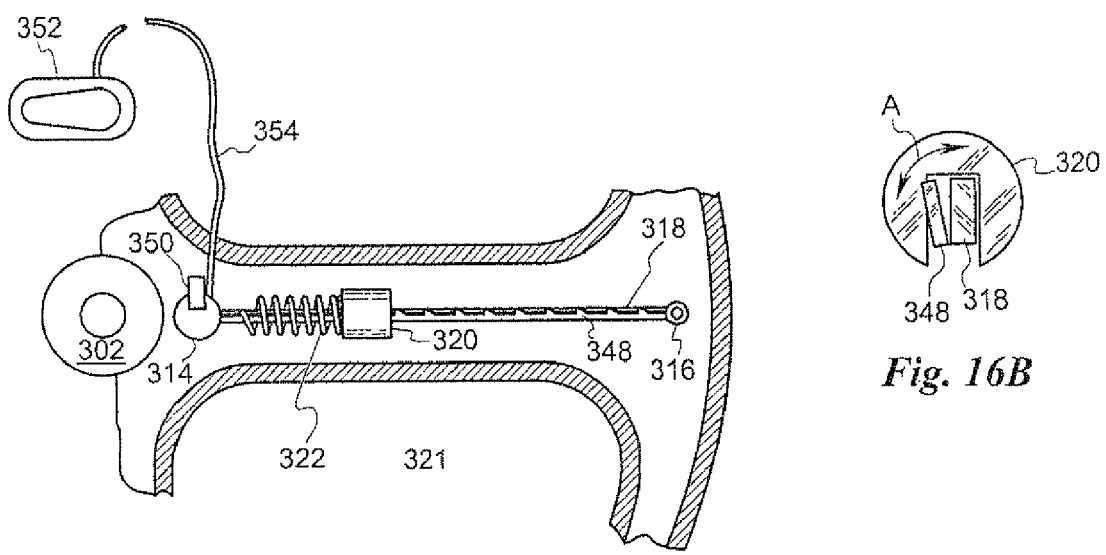
*Fig. 16A*
*Fig. 16B*
*Fig. 16C*

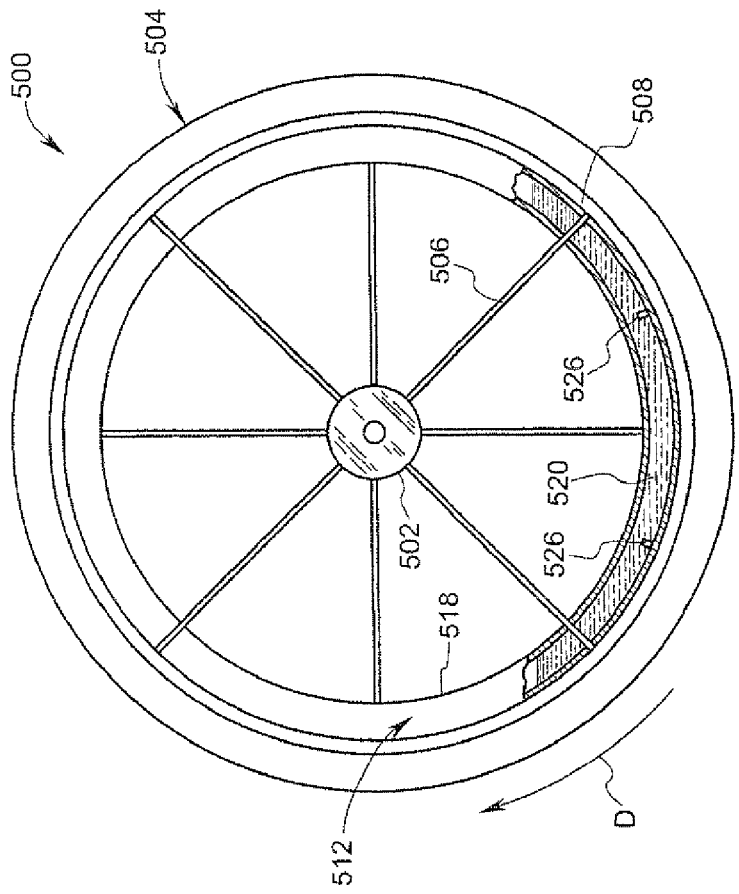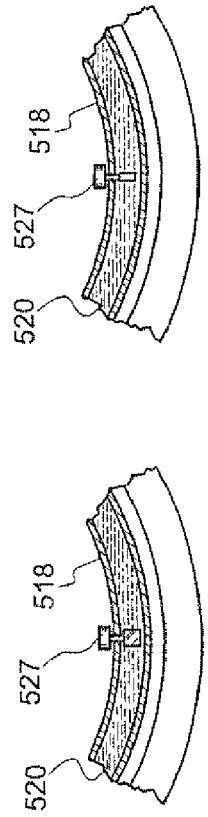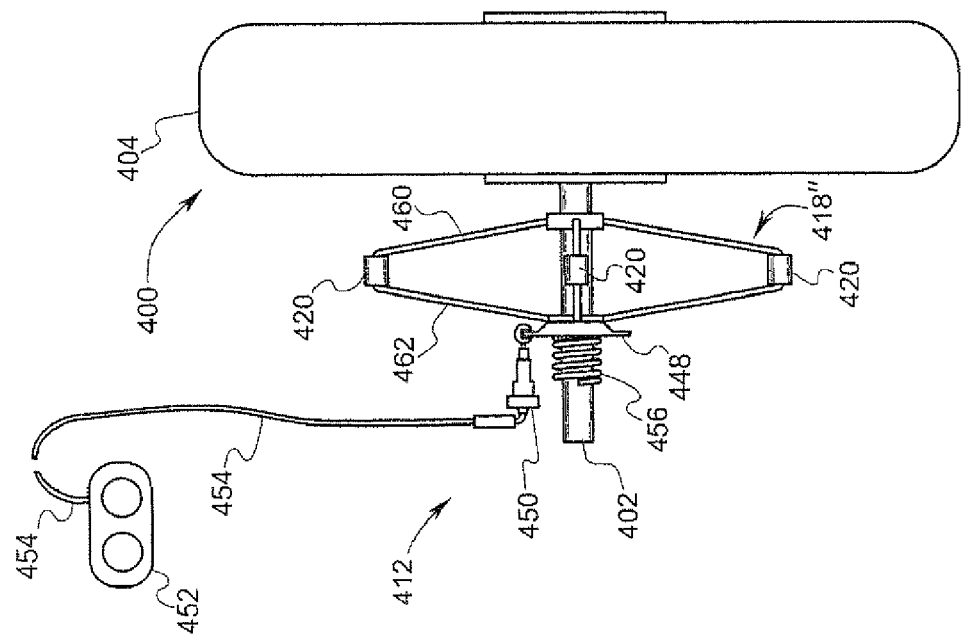

MOMENTUM MANAGEMENT IN A WHEEL SUCH AS A TRACTION WHEEL UNDER A CHANGING LOAD

CROSS-REFERENCE TO RELATED APPLICATIONS

This application claims priority from U.S. Provisional Patent Application Ser. No. 60/944,885, filed Jun. 19, 2007; U.S. Provisional Patent Application Ser. No. 60/888,204, filed Feb. 5, 2007; and U.S. Provisional Patent Application Ser. No. 60/885,720, filed Jan. 19, 2007. The subject matter of these applications is incorporated herein by reference.

FIELD OF THE INVENTION

This invention relates to angular momentum management of wheels such as traction wheels, including those used in bicycles and other man-powered and motor-powered vehicles.

BACKGROUND OF THE INVENTION

In classic Newtonian physics, the concept of inertia is expressed simply as the tendency of a body at rest to remain at rest, and the tendency of a body in motion to remain in motion. The mass moment of inertia is the quality describing the degree of ease or difficulty to change the rotational speed (i.e. the angular velocity) of an object, such as a wheel about its axis. In two wheels of the same shape, but different weights/mass, the heavier wheel (i.e., the wheel with the greater mass) will possess a higher mass moment of inertia and will more slowly accelerate and more slowly decelerate. Also, in two wheels having the same shape and same mass, but where the mass is radially distributed differently, the wheel in which the mass is more radially outwardly distributed will possess a higher mass moment of inertia and will more slowly accelerate and more slowly decelerate.

A common dilemma regarding human-powered vehicles, such as bicycles, and motor-powered vehicles, such as motorcycles, is how to select the mass moment of inertia of the wheels. One may increase the mass moment of inertia by increasing the weight of the rim of the wheel. This will help the wheel maintain higher speeds; however, it becomes more difficult to accelerate the wheel from lower speeds. On the other hand, reducing the weight of the rim of the wheel makes the acceleration from low speeds easier, but it also makes deceleration of the wheels easier.

Moreover, wheeled vehicles are commonly used for traveling on a surface, such as a road, that transitions between inclines, declines, and level surfaces. Such transitions, where gravity plays a role in acceleration and deceleration, further compound the dilemma.

The dilemma of advantages being essentially offset by disadvantage regardless of the selected wheel weight has historically been resolved in favor of lighter wheels due to the fact that lighter wheels are easier to rotate than heavier wheels when traveling uphill, and the two are essentially as easy to rotate when traveling downhill and the fact that the advantageous "run on" of a heavy wheel after traveling downhill generally does not offset the disadvantage of the heavier wheel when traveling uphill.

SUMMARY OF THE INVENTION

The invention is related to a wheel, such as a traction wheel for supporting a vehicle, and having a momentum enhancing apparatus. The apparatus displaces mass, preferably a fluid or solid body, radially from the rotational axis of the wheel, thereby changing the mass moment of inertia. Various forms of the apparatus permit gradual displacement, sudden displacement, automatic displacement, or selectively controlled displacement. The apparatus is believed to be most advantageously employed to displace the mass radially outward during relatively high angular velocities (such as when traveling downhill) and radially inward during relatively low angular velocities (such as when traveling uphill). Also, it is believed advantageous to displace the mass radially outward when the vehicle with which the wheel is associated is traveling down a decline, to increase momentum, and radially inward when the vehicle is traveling up an incline, to decrease momentum.

In one form, the momentum enhancing apparatus includes a fluid body that is radiated between the hub and the rim of the wheel according to centrifugal force. The fluid body is biased toward the hub using elastic bladders, tubes, or other elements.

In another form, the momentum enhancing apparatus includes several solid bodies distributed about the hub. Each of the solid bodies translates along a radially-directed rod according to centrifugal force. Elastic elements such as springs or elastic bands bias the solid bodies towards the hub of the wheel.

In another form, the momentum enhancing apparatus includes several solid bodies distributed about the hub with leaves or pivot arms connecting the solid bodies to the rim or the hub. The bodies pivot outward toward the rim due to centrifugal force. Elastic elements, the leaves themselves, or both may bias the solid bodies toward the hub.

In another form, the momentum enhancing apparatus includes a tube having a fluid contained therein. The tube is substantially concentric with the wheel and rotates with the wheel so that the fluid therein is substantially rotationally idle at low angular velocities and rotates with the wheel substantially only at sufficiently high angular velocities. When the wheel encounters a change in load, the fluid transfers its momentum to the wheel.

In another form, the momentum enhancing apparatus includes a floating ring that is coupled to a support ring that is substantially concentric with the wheel. The support ring and the floating ring rotate independently of one another in one direction. Thus, if the support ring, which rotates with the wheel, begins to decelerate below the angular velocity of the floating ring, the rings become locked together such as by a clutch system and the floating ring transfers its angular momentum to the wheel via the support ring.

Methods of using such apparati, and vehicles equipped with such apparati, are also disclosed.

An advantage of the present invention is that the momentum enhancing apparatus provides the wheel with a variable mass moment of inertia. Thus, the impact of the apparatus on the momentum of the wheel at low velocities is minimal, but the apparatus increases the mass moment of inertia at high velocities to help maintain a higher velocity.

BRIEF DESCRIPTION OF THE DRAWINGS

The present invention is disclosed with reference to the accompanying drawings, wherein:

FIG. 1 is a side view of a schematic illustration of a traction wheel having a centrifugal force momentum enhancing apparatus utilizing a fluid body according to a first embodiment of the invention;

FIG. 2 is a side view of a schematic illustration of an inner bladder that may be utilized to control the fluid body in the fluid channel shown in FIG. 1;

FIG. 3 is a side view of a schematic illustration of an outer bladder that may be utilized to control the fluid body in the fluid channel shown in FIG. 1;

FIG. 4 is a cross-sectional view of a schematic illustration of a tube that may be employed to connect the inner bladder shown in FIG. 2 and the outer bladder shown in FIG. 3;

FIGS. 13A-C are side views of schematic illustrations of a traction wheel having a centrifugal force momentum enhancing apparatus utilizing a radially biased solid body according to another embodiment of the invention;

FIGS. 13D-G are perspective illustrations of various types of bodies that may be employed in the embodiment shown in FIGS. 13A-C and other embodiments;

FIGS. 14B-16A are side views of schematic illustrations of variations of the momentum enhancing apparatus shown in FIG. 14A;

FIG. 16B is an end view of a schematic illustration of the cylindrical body riding on the rod and control band in the apparatus show in FIG. 16A;

FIG. 16C is a side view of a schematic illustration of a portion of the control band in the apparatus shown in FIGS. 16A and B;

FIG. 21 is a perspective view of a schematic illustration of a traction wheel having a momentum enhancing apparatus utilizing tethered solid bodies in which the radial length of the tether may be adjusted;

FIG. 22 is a side view of a schematic illustration of a traction wheel having a friction momentum enhancing apparatus utilizing an annular tube containing a fluid body according to another embodiment of the invention;

FIGS. 23A and 23B are cross-sectional views of schematic illustrations of a portion of the tube shown in FIG. 22 showing a rotatable turbulence paddle;

Corresponding reference characters indicate corresponding parts throughout the several views. The examples set out herein illustrate several embodiments of the invention but should not be construed as limiting the scope of the invention in any manner.

DETAILED DESCRIPTION OF A PREFERRED EMBODIMENT

Figure 5:
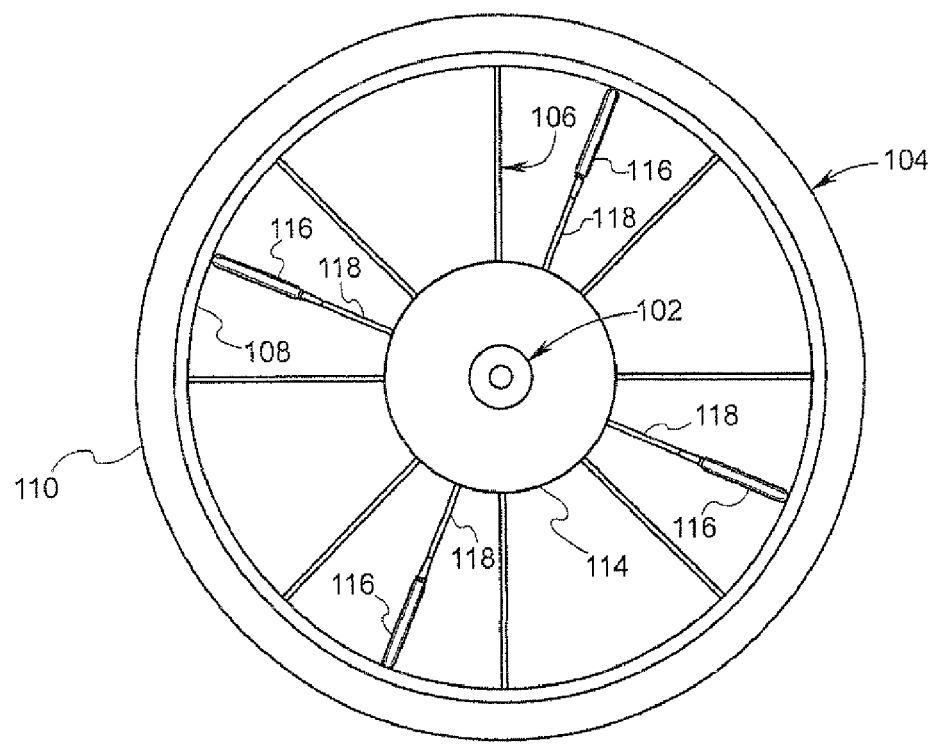
FIGS. 5-7 are side views showing schematic illustrations of variations of the traction wheel shown in FIG. 1.

The invention is directed to a wheel, especially to a traction wheel, with a momentum enhancing apparatus. A traction wheel, as used herein, is any wheel having a peripheral portion adapted to be in contact with a surface, such as a road surface, for supporting a vehicle to which the wheel is attached, and where the contact between the peripheral portion and surface provides locomotive traction to help propel the vehicle.

The momentum enhancing apparatus enhances the wheel's ability to maintain its angular velocity at relatively high speeds, while having a reduced effect on the momentum of the wheel at relatively slow speeds. The momentum enhancing apparatus includes one or more bodies that either translate radially between the rotational axis and the periphery of the wheel to change the mass moment of inertia of the wheel, or that may begin to rotate with the wheel and transfer the momentum of the bodies to the wheel under increasing loads. Thus, the present invention manages momentum to benefit from higher angular velocities of the wheel, especially when transitioning to a higher-load scenario, by adjusting the mass moment of inertia of the wheel.

The following description generally applies to a bicycle wheel; however, one skilled in the art will note that the invention may also be applied to wheels for a motorcycle, an automobile, or another vehicle.

These concepts and others will be better understood with reference to the Figures and the description of the detailed embodiments below.

Centrifugal Force, Fluid Body

An embodiment of the invention utilizing fluids to change the distribution of the mass according to centrifugal force is shown in FIG. 1. The traction wheel 100 includes an axis of rotation, which may be the center of an axle upon which is mounted a hub 102, and an outer peripheral, circular portion 104 with spokes or other support structures 106 therebetween. The support structures 106 may, for example, comprise wire spokes or hollow spokes fashioned of carbon composite material or may even comprise a single disc or a pair of spaced discs. The peripheral portion 104 preferably includes a rim 108 and a tread 110, which may be part of a pneumatic tire.

A momentum enhancing apparatus 112 cooperating with the wheel 100 includes several discrete inner bladders 114 that are evenly distributed radially about the hub 102, a corresponding number of outer bladders 116, evenly distributed radially along the radially inner portion of the rim 108, and a corresponding number of tubes 118 providing fluid communication of a working fluid between each of the inner bladders 114 with an associated one of the outer bladders 116.

Each of the inner bladders 114, shown in FIG. 2, are made of rugged material preferably with an expanding bias, such as rubber or another durable, flexible, and elastic material. The expanding bias gives the inner bladder 114 a tendency to expand and, thus, to draw the working fluid into the bladder. The inner bladder 114 includes a tube connector 122, which may be a bayonet-type connector, a quick-disconnect connector, or any other suitable connector by which the inner bladder 114 is attached to an associated tube 118 such that the interior of the inner bladder 114 is in sealed, fluid communication with the interior of the tube 118. Alternatively, the tube 118 may be formed integrally with the inner bladder 114.

The outer bladder 116, shown in FIG. 3, is also preferably made of a rugged material, such as rubber or another durable, flexible, and elastic material. The outer bladder 116 may also include ribs 124 in the bladder wall for added support and durability. The outer bladder 116 also includes a tube connector 122, which may be a bayonet-type connector, a quick-disconnect connector, or any other suitable connector by which the outer bladder 116 is attached to the associated tube 118 such that the interior of the outer bladder 116 is in sealed, fluid communication with the interior of the tube 118. Alternatively, the tube 118 may be formed integrally with the outer bladder 116. The outer bladder 116 is shown at rest in FIG. 3 with its expanded state shown in dashed lines. The outer bladder 116 expands as it fills with the working fluid 120 under high rotation of the wheel 100. The forces acting upon the working fluid 120 will be relatively high when the fluid is in the outer bladder 116, so the material forming the outer bladder 116 should be relatively strong and preferably reinforced such as with the ribs 124.

The tube 118, a portion of which is shown in cross-section in FIG. 4, is preferably made of a rugged material, such as rubber, plastic, metal, or a carbon composite. In the particular embodiment shown, the tube 118 preferably includes vanes 126 angularly extending in a direction away from the hub 102. The vanes 126 slow the return of the working fluid 120 to the inner bladder 114, forcing the wheel 100 to retain its high rotational momentum longer as the load increases (e.g., a road transitions from a declining slope to a level surface). Retaining the higher momentum slows the deceleration of the wheel. Thus, the tube 118 has unidirectional fluid transfer characteristics, or fluid hysteresis. Alternatively, the vanes 126 may be reversed so they are directed toward the hub 102. This helps prevent the working fluid 120 from moving quickly to the outer bladder 116 during a momentary increase in speed, such as with a brief burst in acceleration. The vanes 126 may be made of an elastic material to enhance the fluid hysteresis of the tube 118 such that they bend toward the interior tube wall to allow substantial fluid flow in one direction and bend radially inward when the fluid flows in the opposite direction to hinder fluid flow in that direction. The fluid hysteresis of the vanes 126 may be chosen according to the user's preferences, the viscosity of the fluid, and the anticipated road conditions. The vanes 126 may be fashioned like fingers, like annular rings, in a series of ridges, in a continuous helix, or in other configurations. They may also be tapered from base to tip, may possess a cupped surface, or may possess other profiles. Alternatively, the interior surface of the tube 118 may be dimpled or possess another type of irregular profile that affects flow characteristics of the working fluid.

Further alternatively to the vanes 126, the tube 118 may have an adjustable diameter or include electronically-controlled, selectively operable valves to control fluid transfer rates. In a particular embodiment, the tube 118 may be separated into two channels: a hub to rim channel and a rim to hub channel. The hub to rim channel may include a diode valve (i.e., a one-way valve) near the inner bladder 114 and the rim to hub channel may include a diode valve near the outer bladder 116. The tube 118 may also be fitted with a valve that freely permits flow in a radially inward direction, but does not permit flow in a radially outward direction until the fluid pressure within the tube 118 (due to centrifugal force) reaches a predetermined magnitude, at which point the valve opens to allow the fluid to flow radially outward to the outer bladder 116. Alternatively each channel may include vanes having different fluid hysteresis characteristics.

The working fluid is a fluid, such as a liquid with a preselected viscosity. For example, the fluid may be an oil-based or water-based liquid with a viscosity chosen for a particular responsiveness desired by the user. Particularly, a high viscosity would correlate to a slower response of the fluid. In an alternative embodiment, the working fluid may be a granular solid, such as a fine sand, that acts in a fluidized manner, and which may be especially useful in motorized vehicles. The working fluid may also comprise a liquid in which granular solids are dispersed. The volume or the mass of the body of working fluid may also be varied and preselected.

A rudimentary form of the momentum enhancing apparatus shown in FIG. 1 may employ Fleet® Babylax® suppositories for the inner bladder 114, AcuLife® finger protectors for the outer bladder 116, an eight-inch length of clear vinyl tubing for the tube 118, and two ounces of virgin olive oil as the working fluid.

Alternatively to having several inner bladders 114, the wheel 100 may include a single inner bladder 114' that feeds the working fluid to the outer bladders 116 via the tubes 118. This alternative is shown schematically in FIG. 5.

Figure 6:
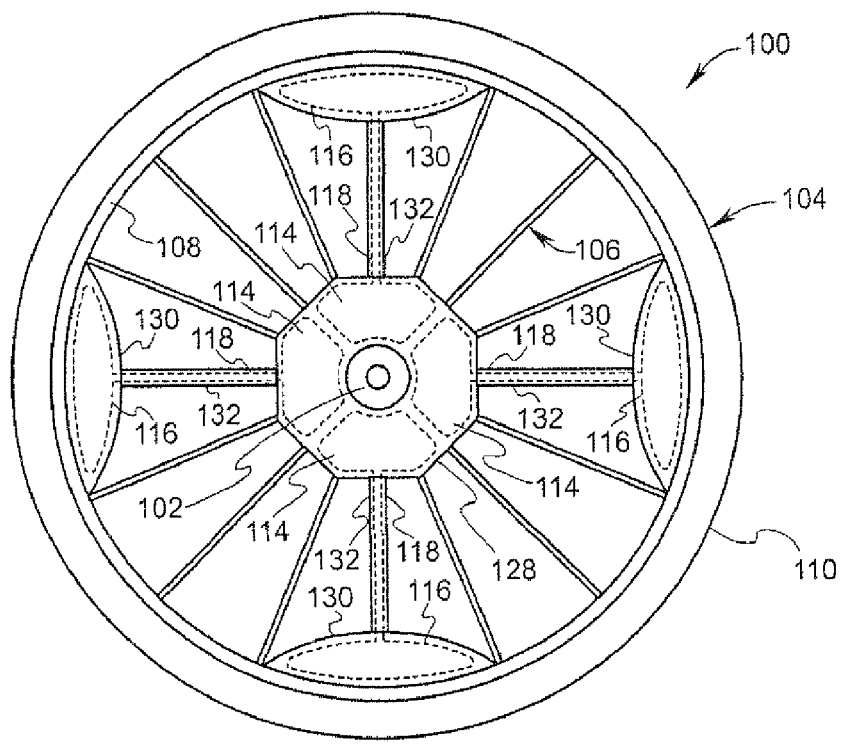

Further, the number and distribution of bladders in FIGS. 1 and 5 are by way of example and may be varied. However, it is preferred that the bladders be evenly distributed radially on the wheel 100 to avoid an imbalance in the wheel. In a further example, FIG. 6 shows a wheel 100 having four inner bladders 114, four outer bladders 116, and four tubes 118. FIG. 6 further shows how the bladders and tubes may be contained within housings to protect them and to minimize adverse aerodynamic effects of the momentum enhancement apparatus 112 on the wheel 100. The housings preferably include an inner housing 128 that is affixed to the hub 102, an outer housing 130 that is integrated with the rim 108, and an aerodynamic tube housing 132. An embodiment having a single inner bladder 114' may not need an inner housing 128 because the single inner bladder may be more easily formed in the desired aerodynamic shape than the discrete inner bladders 114.

Figure 7:
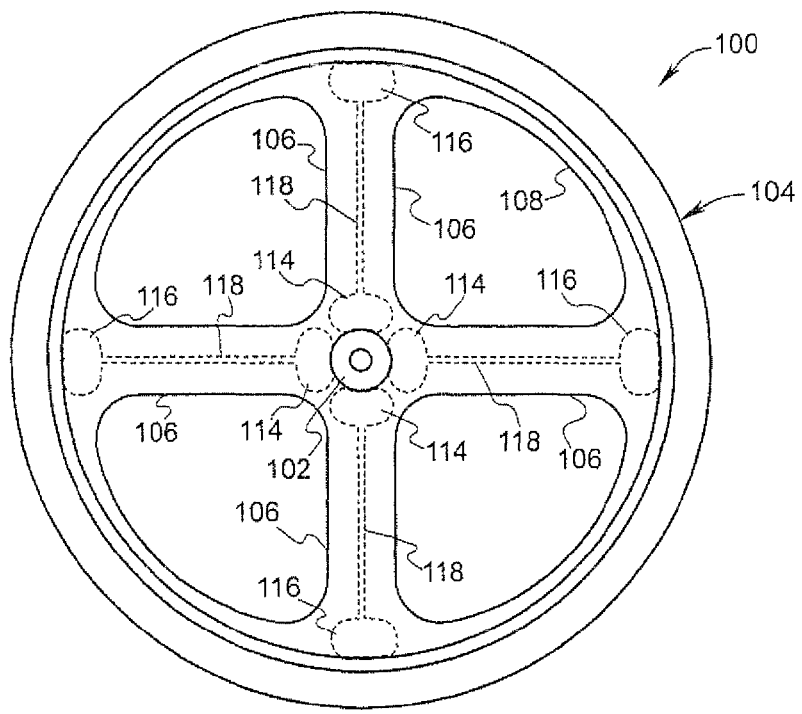

Many high-performance wheels use a small number of hollow, aerofoil-type spokes 106, as shown in FIG. 7, that are usually fashioned of carbon fibers. The inner bladders 114, the outer bladders 116, and the tubes 118 may be advantageously integrated into such aerofoil spokes to minimize the additional weight of the momentum enhancing apparatus 112, to protect the apparatus 112, and to avoid any deterioration in the aerodynamics of the wheel 100.

In use, the traction wheel 100 is rotated about the axle/hub 102 while the peripheral portion 104 is in contact with a supporting surface, such as a road, as the vehicle is propelled. Assuming no slipping of the wheel 100 in connection with its contact with a supporting surface, the forward velocity of the vehicle is proportional to the angular velocity of the wheel 100. One will note that the wheel 100 may be a driven wheel, such as the rear wheel of a bicycle, or a non-driven, idle wheel, such as the front wheel of a bicycle, or both. As the angular velocity of the wheel's rotation increases, the centrifugal force acts upon the fluid body and tends to drive the fluid radially outward. Further increases in the angular velocity result in a stronger centrifugal force and a correspondingly stronger tendency to drive the fluid radially outward. Thus, the fluid will gradually overcome the bias of the inner bladder 114 and any other biases of the apparatus 112 that tend to retain the fluid radially inward, and the fluid will be gradually displaced radially outward. It is preferred that the bladders and tubes are configured such that the working fluid radiates outward through all the tubes 118 at substantially the same rate so that the wheel 100 does not become unbalanced. At some angular velocity (what may be deemed a critical angular velocity), the body of fluid reaches its essentially most radially outward position. The degree of graduation of fluid displacement and the critical angular velocity may be selected through appropriate selection and calibration of parameters such as the magnitude of the bias of the inner bladder 114, the viscosity of the working fluid, the inner diameter of the tube 118, and the nature of the vanes 126 in the tube interior. The characteristics of the inner bladder 114, outer bladder 116, tubes 118, working fluid, etc., may be selected according to the designer's or user's preference, as previously stated. These components may be interchangeable with similar components possessing different parameters and characteristics.

In some embodiments, such as where the tube 118 is fitted with a selectively operable valve, or a pressure responsive valve, the fluid displacement may be selective or automatic, and essentially sudden.

After the radially outward displacement of the fluid 120, the wheel 100 possesses a higher mass moment of inertia because the mass of the working fluid is closer to the peripheral portion 104. The momentum helps the wheel 100 maintain its velocity under changing loads, such as transitioning from a declined surface to a substantially level surface. As the rotation of the wheel 100 eventually slows, the centrifugal force on the working fluid decreases and any expanding bias of the inner bladder 114 begins to draw the working fluid through the tube 118 and into the inner bladder 114 until the inner bladder 114 is full or until the rotational velocity of the wheel begins to increase. The fluid hysteresis will affect the communication of the working fluid through the tubes 118.

As an example, a particular rider may prefer to set the parameters of the momentum enhancing apparatus 112 (i.e., the expanding bias of the inner bladder 114, the diameter of the tube 118, and the viscosity of the working fluid 120) such that the center of mass of the working fluid is at least 6 inches from the hub 102 for road speeds of over 19 miles per hour and within 6 inches for road speeds under 19 miles per hour.

The momentum enhancing apparatus of the present invention may include adjustable parameters so that users may experiment with and calibrate the parameters to optimize the performance of the apparatus, or to tailor the apparatus for certain riders or road topography. Thus, the momentum enhancing apparatus may be customized to alter the degree or magnitude of momentum change, the nature of the event when the change occurs, and how quickly the change occurs. For example, any of the inner bladder 114, the outer bladder 116, or the tube 118 may be replaced to change the bias of the working fluid toward the hub 102 or to change the fluid hysteresis. For example, the position of the tube 118 may simply be reversed thereby changing the direction of the fluid hysteresis. Further, any bias may be adjusted by pumping air into the bladders or releasing the air, even to the degree of exhausting all air from within the bladders and tube. Higher air pressure in the bladders would result in a smaller bias on the working fluid. The air pressure may be changed by an electronic mini-pump that a user controls with a remote control. Alternatively, one or both bladders may include a receptacle for an air pump and a user may change the pressure with a standard bicycle pump.

Figures 8, 9:
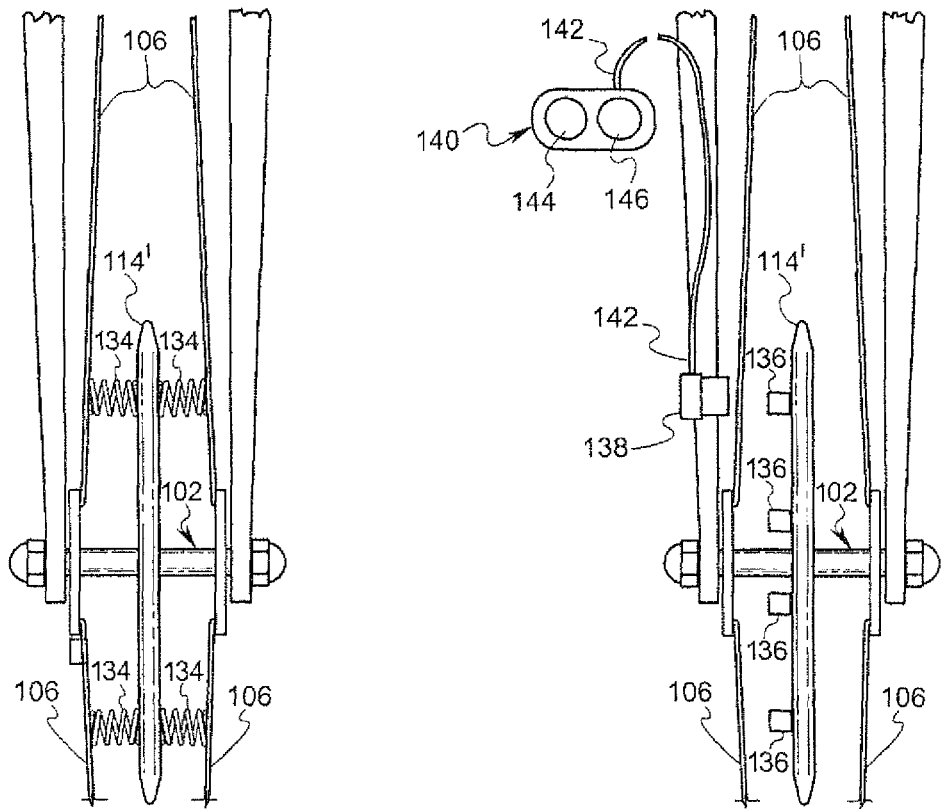
FIGS. 8-10 are isometric views of schematic illustrations of different apparati altering the bias or volume of the inner bladder shown in FIG. 5.

The expanding bias of the inner bladders 114 may be increased by external elements if the bias of the bladder alone is not sufficient. Particularly, FIG. 8 shows the hub 102 and bicycle fork of a wheel with a single inner bladder 114' and spokes 106. Although a plurality of discrete inner bladders 114 may be used, instead, a single inner bladder 114' is shown for simplicity. Elastic elements 134, such as compression springs or elastic bands, are attached to the wall of the inner bladder 114' and to a rotating portion of the wheel, such as the hub 102 or the spokes 106 (illustrated). In a particular embodiment, the elastic elements 134 are distributed evenly on either side of the inner bladder 114' and about the hub 102. The elastic elements 134 thus increase the bias of the inner bladder 114' to expand and the tendency to draw the working fluid 120 into the inner bladder 114'. The bias may be adjusted by replacing the elastic elements 134 with elements having a different spring constant, or by adjusting the strain on the elements. For example, the bias may be increased by moving the end of the elastic elements 134 higher on the spokes 106 to increase the strain on the elastic elements 134.

The expanding bias of the inner bladder 114' may be alternatively enhanced using permanent magnets and an electromagnet as shown in FIG. 9 to allow the user to dynamically control the bias on the working fluid 120. The permanent magnets 136 are affixed to the wall of the inner bladder 114', and the electromagnet 138 is affixed to a non-rotating element, such as the bicycle fork. In a particular embodiment, the permanent magnets 136 are distributed evenly about the hub 102. While only one electromagnet 138 is shown, multiple electromagnets may be included, such as with one on each side of the bladder 114'. The electromagnet 138 is controlled by a remote control 140, which is placed within reach of the user, such as on bicycle handle bars. The remote control 140 communicates with the electromagnet 138 via a cable 142 or wirelessly. The remote control 140 may include a hub button 144 and a rim button 146. The hub button 144 activates the electromagnet 138 to attract the permanent magnets 136 and thereby draw the working fluid 120 into the inner bladder 114'. The rim button 146 would also activate the electromagnet 138, but it would reverse the polarity of the electromagnet 138 to repel the permanent magnets 136 to thereby expel the working fluid 120 from the inner bladder 114'.

Figure 10:
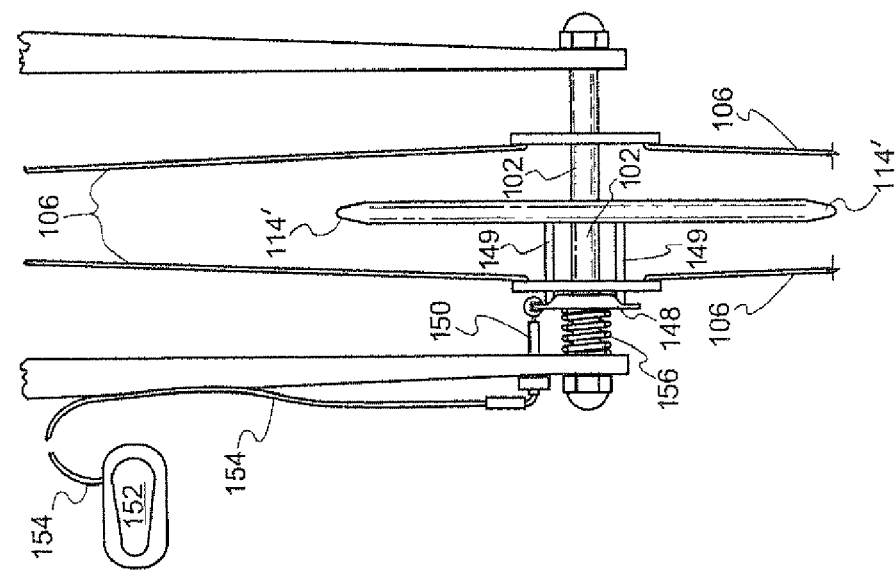

In a further alternative, the expanding bias of the inner bladder 114' may be enhanced with a spring-loaded flange and control piston as shown in FIG. 10. The control flange 148 is affixed to the wall of the inner bladder 114' and slidably mounted to the hub 102. A bushing or a bearing may be included between the control flange 148 and the hub 102. A control piston 150 is attached to a non-rotating element, such as the frame of the vehicle, and engages the control flange 148. A control lever 152 is connected to the piston 150 via a control cable 154, which may be similar to a brake cable for a bicycle. Movement of the lever 152 in one direction pulls the cable 154 and thereby pulls the piston 150 away from the inner bladder 114', which, in turn, pulls the control flange 148 toward the outside of the hub 102 and expands the inner bladder 114', thereby drawing the working fluid 120 into the inner bladder 114'. Movement of the lever 152 in the opposite direction allows the piston 150 to extend and thereby expel the working fluid 120 from the inner bladder 114'. A spring 156 biases the control flange 148 towards the center of the hub 102 to extend the piston 150 and take up any slack in the cable 154.

The volume of the inner bladders 114 may alternatively be controlled by including ribs made of a piezoelectric material in connection with the wall of each of the inner bladders 114. The piezoelectric ribs may be embedded in the wall or affixed to a surface of the wall. Any of a number of different piezoelectric materials may be used. The piezoelectric ribs may be configured so that an electric current of one polarity causes the piezoelectric ribs to contract thereby decreasing the internal volume of the inner bladder 114 and expelling working fluid 120. An electric current of the opposite polarity would cause the piezoelectric ribs to extend thereby increasing the internal volume of the inner bladder 114 and drawing in working fluid 120. A simple circuit including a user-controlled switch, a power source, and electrodes attached to the ends of the piezoelectric ribs may be utilized to selectively supply the electric current. Alternatively, a more complex circuit including a microprocessor may be utilized.

Figure 11:
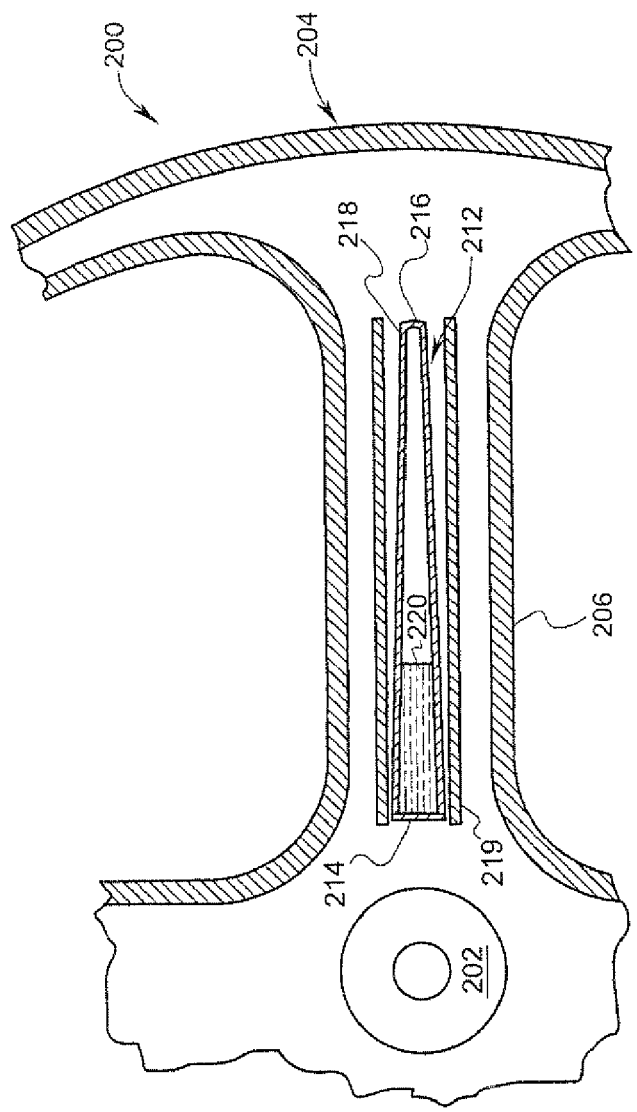
FIGS. 11 and 12 are side views of schematic illustrations of another embodiment of the centrifugal force momentum enhancing apparatus utilizing a tapered elastic tube that contains a fluid body.

In an alternative embodiment shows in FIG. 11, the wheel 200 includes a hub 202, a peripheral portion 204, supports or spokes 206, and a momentum enhancing apparatus 212. The momentum enhancing apparatus 212 includes an elastic tube 218 containing a working fluid 220. The tube 218 extends radially within the support of spoke 206 and possesses a generally conical external and internal configuration, including a tapered elastic wall with a larger diameter at the hub end 214 and a smaller diameter at the peripheral end 216. The elasticity of the tube wall biases the working fluid 220 toward the hub 202. FIG. 11 shows the wheel 200 having aerofoil-type spokes 206 with the tube 218 retained by ridges 219 within an aerofoil spoke 206. The tube 218 may be affixed to the ridges 219 by means of an adhesive applied along the larger diameter end of the tube 218. Alternatively, the ends of the tube 218 may be attached to the hub and to the rim of a standard wheel. Further, the tube 218 may be attached to standard spokes or other wheel supports. The tube 218 may also be disposed in a protective tubular housing. The tubes 218 are preferably distributed evenly about the hub 202 so that the wheel 200 is balanced.

Figure 12:
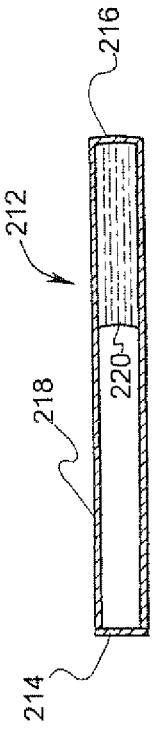

In use, as the vehicle travels above the critical velocity (as described above), the centrifugal force on the working fluid 220 due to the rotation of the wheel 200 forces the fluid against the elastic bias of the tube 218 to move the fluid towards the peripheral end 216, as shown in FIG. 12. As the speed decreases, the elastic bias will gradually overcome the centrifugal force and force the fluid 220 back to the hub end 214.

As shown in FIG. 11, the working fluid 220 may comprise a liquid that only partially fills the tube 218, with the remaining portions of the tube 218 filled with a gas (such as air). The gas may possess a pressure selected anywhere from zero (i.e., a vacuum) to much higher than ambient pressure, which also may influence the radial translation of the working fluid 220. Alternatively, the working fluid 220 may completely fill the tube 218 and simply deform and bulge the radially outer end of the tube 218 at relatively high angular velocities.

Fluid hysteresis may be introduced into the tube 218 as described with respect to the tube 118 above. For example, the tube 218 may include vanes similar to the vanes 126 described above.

The critical speed of the momentum enhancing apparatus 212 may be adjusted by simply replacing the tubes 218 with tubes having a different elastic bias, having a different taper or other contour, having different fluid, etc. The tubes 218 may also include a closure such as a screw-on or other cap at one end that allows the user to change the working fluid 220, such as by using a fluid with a higher viscosity or altering the volume of fluid.

Centrifugal Force, Solid Body

Figure 13A:
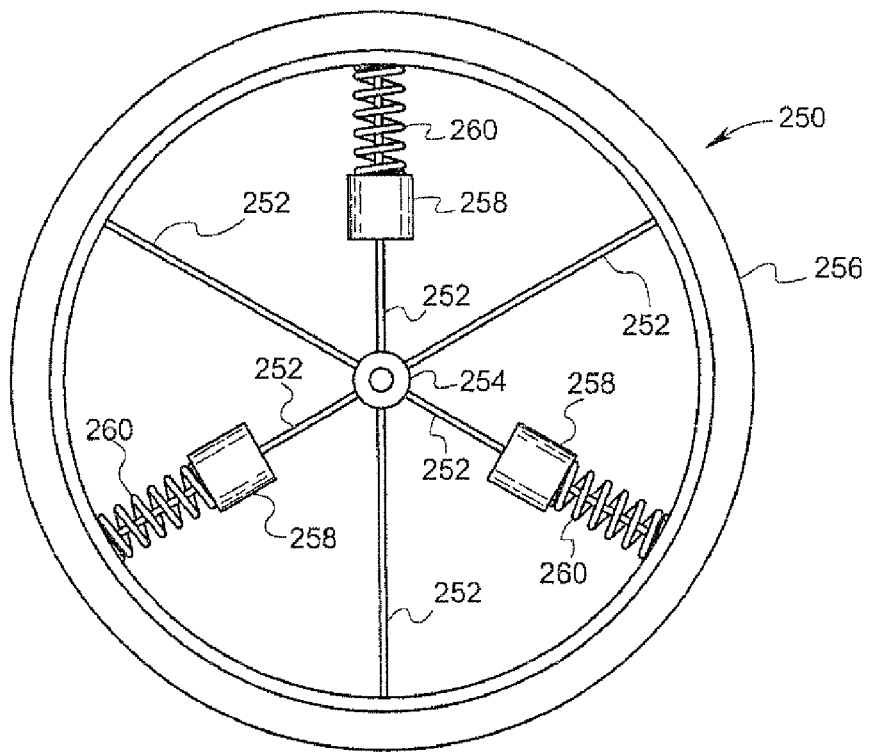
Figure 13B:
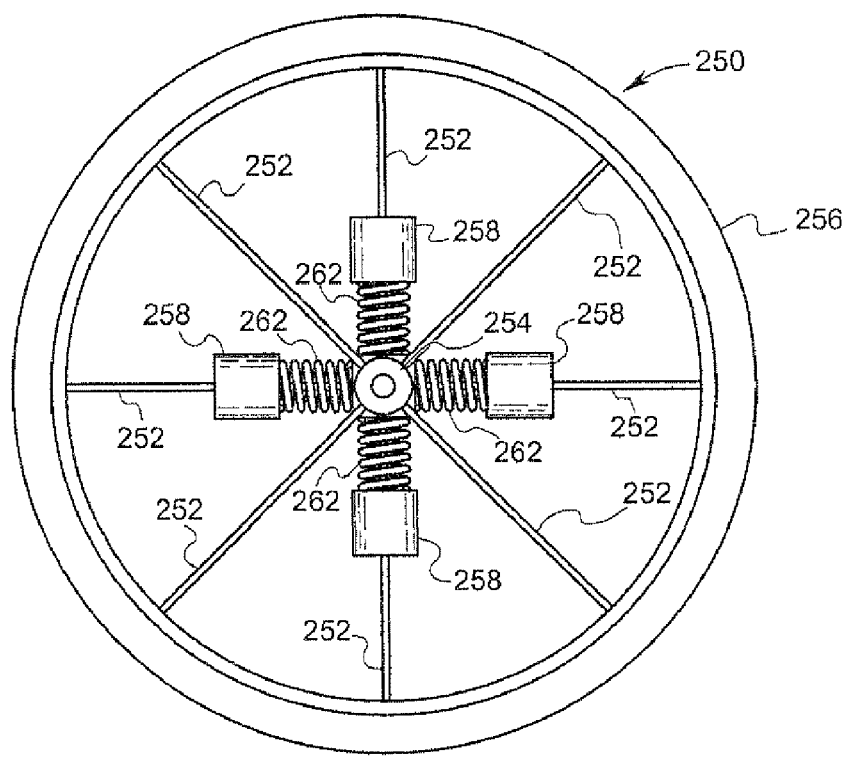
Figure 13H:
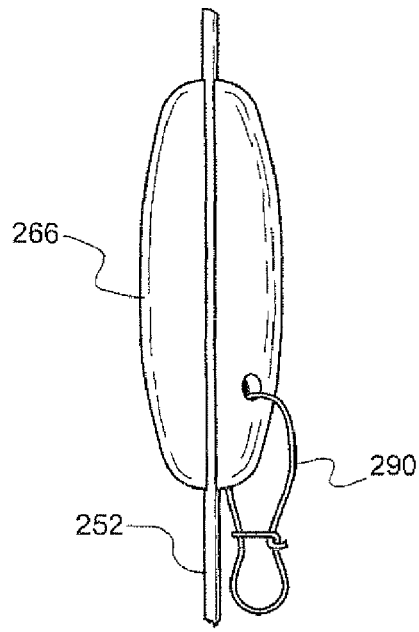
FIGS. 13H-K are perspective illustrations of portions of a traction wheel employing the momentum enhancing device shown in FIG. 13D.
Figure 13I:
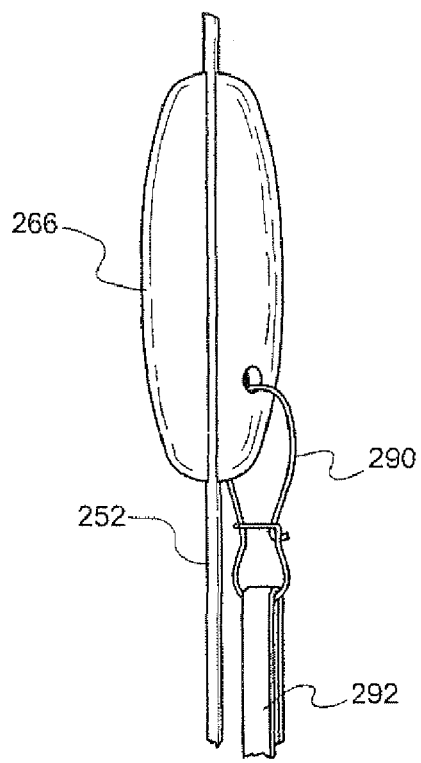

In an alternative embodiment, the body of the momentum enhancing apparatus comprises a solid mass that translates between the hub and the periphery of the wheel to adjust the mass moment of inertia of the wheel. In one embodiment, shown in FIGS. 13A-C, the wheel 250 may be provided with a plurality of wire spokes 252 (in FIGS. 13A and 13C there are six spokes, and in FIG. 13B there are eight spokes) equiangularly extending from the hub 254 to the rim 256. A body 258, such as a piece of metal, is slidably mounted on an associated spoke 252. As shown in FIG. 13D, body 258 may comprise, for example, a lead sinker 266 commonly used on fishing lines, where the sinker is fashioned as an elongate object having a longitudinal channel 268 depending from the exterior surface to the center of the sinker and having a pair of malleable end tabs 270 that may be bent over the channel 268. The width of the channel 268 should be large enough to accommodate the diameter of the metal spoke 252. The size and associated weight/mass of the sinker 266 or other type of body 258 may be selectively chosen. Preferably a plurality of the bodies 258 are equiangularly disposed on associated spokes 252 of each wheel 250. In FIGS. 13A and C, three bodies 258 are utilized, whereas FIG. 13B shows four such bodies 258 being utilized.

Other types of bodies 258 may also be advantageously employed. As shown in FIG. 13E, the body 258 may comprise a hollow bulb 272 provided with a central borehole 274 therethrough (through which a spoke 252 may extend) and provided with an opening to the bulb interior selectively opened and closed by a screw-on cap 276 or other closure. The bulb 272 may be rigid, may be pliable, may be collapsible, and may be elastic and expansible. Through the opening secured by the cap 276, a fluid may be injected into or removed from the interior of the bulb to selectively change the overall weight/mass thereof. FIG. 13F shows a different body having a generally cylindrical, preferably rigid housing 278 having a central borehole 280 therethrough (through which a spoke 252 may extend) that contains a preferably collapsible fluid-tight bag 282 (shown in dotted lines) fitted with a nozzle opening that extends through the housing 278, which nozzle opening may be selectively opened and closed by a screw-on cap 284 or other closure. Through the nozzle opening a fluid may be injected into or removed from the bag 282 to selectively change the weight/mass of the body. The housing 278 may be fashioned of many shapes, including those that have preferred aerodynamic properties. FIG. 13G shows a body formed of several discrete, identically shaped washers 286 each provided with a pair of oppositely positioned holes through which a pair of bolts 288 may extend in order to align and clamp the washers 286 together. The bolts 288 may be manipulated to add or remove washers 286 thereby to selectively change the overall weight/mass of the body. Each washer 286 may be configured as a circular disc, a square disc, a donut shape, or some preferred aerodynamic shape.

For a given elastic tension or force, the angular velocity at which the body begins to translate radially outward varies depending upon the magnitude of the overall weight/mass of the body. Thus, the effect of the momentum enhancing device may be selectively varied and calibrated for different riders and road topography.

In the wheel 250 of FIG. 13A, a coiled extension spring 260 acts upon an associated body 258. One end of the coiled extension spring 260 is attached to the rim 256, and the other end is attached to the body 258 such that the wire spoke 252 extends through the center of the coiled extension spring 260. It will be appreciated that in this embodiment, the coiled extension spring 260 acts to bias its associated body 258 in a radially inward position, and that as the wheel 250 rotates, centrifugal force acts against the coiled extension spring 260 to displace the associated body 258 radially outward. As the angular velocity of the wheel 250 increases, the centrifugal force will correspondingly increase, and each body 258 will have a greater tendency to be displaced radially outward.

The wheel 250 shown in FIG. 13B includes a coiled compression spring 262 acting upon an associated body 258. Each coiled compression spring 262 has one end attached to the hub 254 and the other end attached to the body 258, with a spoke 252 extending therethrough. It will be appreciated that the coiled compression spring 262 tends to retain its associated body 258 radially inward, but as the wheel 250 rotates, the centrifugal force tends to displace each body 258 radially outward. As the wheel 250 increases its angular velocity, the centrifugal force acting on body 258 increases, and the body 258 is displaced further radially outward.

The wheel 250 shown in FIG. 13C discloses an elastic band 264 acting upon an associated body 258. Each elastic band 264 has one end thereof attached to the hub 254 and the other end thereof attached to the associated body 258. The elastic band may comprise a "bungee" type of cord, or may be, for example, a circular rubberband. Again, rotation of the wheel 250 results in a centrifugal force acting upon each body 258, such that each body is displaced radially outward against the bias of the elastic band 264.

In the embodiments shown in FIGS. 13A-C, the lengths and the degrees of bias of each of the springs 260, 262 and the elastic band 264 may be selected and pre-determined. Each of the bodies 258 is preferably of the same weight/mass and each of the springs 260 and each of the springs 262 preferably has the same length and spring constant. Likewise preferably each of the elastic bands 264 has the same length and same elasticity. The bodies 258 may be interchangeable with other, different bodies to alter the amount of mass on each body. Similarly, the springs 260, springs 262, and elastic bands 264 may be interchangeable with other springs and elastic bands having different biasing and other characteristics. Also the springs and elastic bands may have non-linear biasing forces as the springs and elastic bands extend and contract, and such components may be selected for their non-linear biasing properties.

Figure 13J:
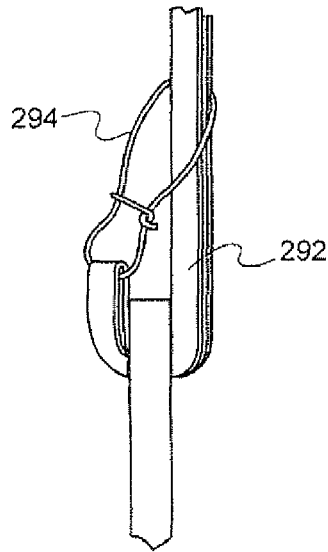
Figure 13K:
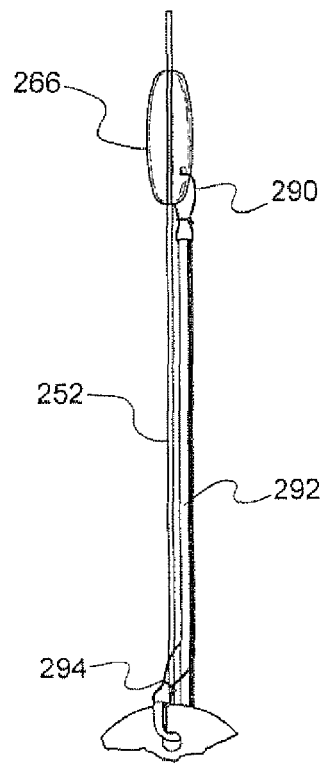

FIGS. 13H-K show a rudimentary implementation of the momentum enhancing device shown in FIG. 13C employing a lead sinker as the radially translating body, as shown in FIG. 13D. The sinker 266 is slidably mounted on and translates along an associated wire spoke 252. A hole is drilled laterally through one end of the sinker 266 and selectively receives a first ring-like clasp 290, which also selectively extends through and captures a circular rubber band 292. Another, second ring-like clasp 294 selectively extends through a corresponding hole in the hub of the wheel, as best shown in FIG. 13J, and also selectively extends through and captures the rubber band 292. Thus the rubber band 292 is connected via the first ring-like clasp 290 to the sinker 266 and via the second ring-like clasp 294 to the wheel hub. In a first rudimentary version, the sinker 266 comprises a Bass Pro® one ounce rubber grip weight, the ring-like clasps comprise Berkeley® wire wound fishing leader hooks, and the rubber band possesses a rectangular cross-section having a one-sixteenths of an inch width. In a second rudimentary version, the sinker 266 comprises a Bass Pro® three-fourths ounce rubber grip weight, the ring-like clasps comprise Berkley® wire wound fishing leader hooks, and the rubber band possesses a rectangular cross-section having a one-thirty-seconds inch width. During experiments with the versions on a Rolf® Vector® bicycle wheel, the sinkers extend about three inches from the hub at low speeds and extend a maximum of about ten inches from the hub at high speeds. The first rudimentary version attained essentially full extension when the wheel achieved a linear velocity of about twenty-four miles per hour, and the second rudimentary version attained essentially full extension when the wheel achieved a linear velocity of about seventeen or eighteen miles per hour. A single wheel may employ a plurality of the first rudimentary versions equiangularly disposed on the wheel spokes and a plurality of the second rudimentary versions equiangularly disposed on (others of) the wheel spokes.

Figure 14A:
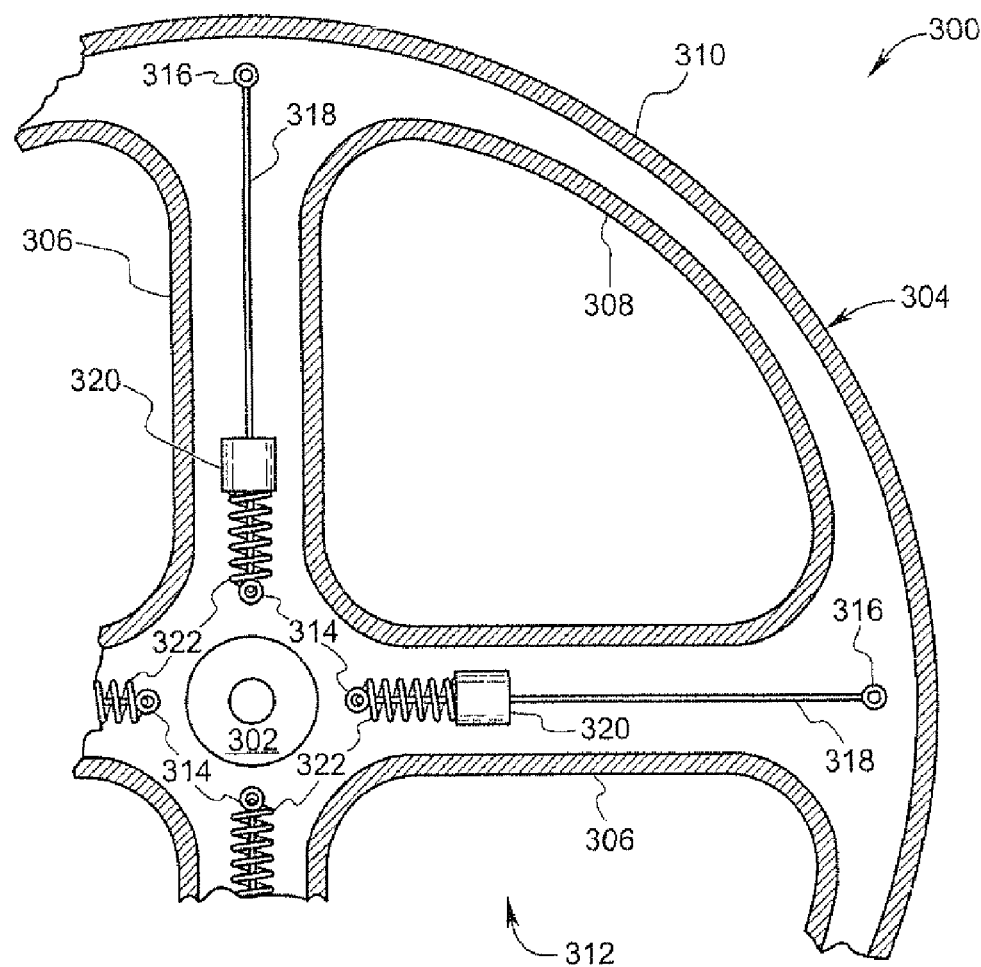
FIG. 14A is a side view of a schematic illustration of a traction wheel having a centrifugal force momentum enhancing apparatus utilizing a radially spring-biased solid body according to another embodiment of the invention.

In yet another embodiment, the wheel 300, shown in FIG. 14A, includes a hub 302, a peripheral portion 304, and supports 306 in the form of aerofoil spokes 306; however, standard bicycle spokes and other wheel supports may also be used. The peripheral portion 304 includes a rim 308 and a tread 310, such as a tread associated with a pneumatic tire. The momentum enhancing apparatus 312 includes several support rods 318 preferably distributed equiangularly about the hub 302 and having a hub end 314 and a peripheral end 316. In the aerofoil-spoke configuration shown in FIG. 14A, the rods 318 are each robustly secured to the inside of the aerofoil spokes 306 at each end 314 and 316. The rod 318 may alternatively be affixed to the hub 302 and the peripheral portion 304 of a wheel having a different configuration. Further, the rod 318 may be affixed to standard bicycle spokes. A body 320 engages each of the rods 318 through a slot or a through bore. The body 320 may, for example, comprise a unitary cylindrical piece of metal, or may be fashioned similar to the bodies shown in FIGS. 13D-G. In a particular embodiment, the rod 318 is highly polished and oiled to allow smooth translation of the body 320 on the rod 318. A biasing element 322, such as a compression spring or an elastic band, is connected to the hub end 314 and the body 320. Each body 320 preferably has substantially the same mass, and each biasing element 322 preferably has substantially the same spring constant and length to avoid an imbalance in the wheel 300. Some experimentation by the user may be required to determine the optimum mass of the bodies 320 and the optimum biasing force on the bodies 320 by the biasing elements 322. Therefore it is preferred that the bodies 320 may be interchanged with bodies having a different mass. The biasing force may be adjusted by replacing the biasing elements 322 with elements having a different spring constant. Alternatively, the initial strain on the biasing elements 322 may be adjustable, such as by changing the length of the biasing elements 322.

The biasing force is typically linear through most of the extension and contraction of the biasing components; however, one may use a biasing element 322 with a non-linear elasticity response, such as an elastic band with a varying thickness. In another example, the biasing element 322 may be configured with an initially high spring constant so that the body 322 moves outward; however, once the wheel 300 reaches a certain rotational speed, correlating with a particular position of the body 320 on the rod 318, the spring constant decreases, allowing smaller increases in speed to move the body 320 more quickly toward the peripheral portion 304. Thus, the momentum enhancing apparatus 312 would have a slow initial response for quick increases in speed, such as when preparing for an inclined road condition, but the body 320 would quickly move outward at higher speeds, such as when traveling down a declined road condition.

Each of the rod 318, body 320, and biasing element 322 assemblies may be contained within an aerodynamic housing, such as the housing described in an earlier described embodiment. Such housings would be useful in wheels without the high-end aerofoil spoke design and would limit the aerodynamic impact of the momentum enhancing apparatus 312.

In use, the wheel 300 rotates as the vehicle is ridden or driven and the biasing elements 322 counteract the centrifugal force on the bodies 320. The centrifugal force begins to overcome the biasing force of the biasing elements 322, and the bodies 320 begin to translate outward from the hub 302 on the rods 318. When the speed of the wheel 300 is sufficiently high, such as when traveling down a declined surface, the centrifugal force moves the bodies 320 to the peripheral end 316 of the rods 318. The momentum enhancing apparatus 312 has now increased the mass moment of inertia of the wheel 300. This gives the wheel 300 a higher momentum that will resist deceleration of the wheel 300. As the load on the wheel 300 increases, such as when transitioning from a declined surface to a level or inclined surface, the rotational speed of the wheel 300 eventually slows, decreasing the centrifugal force on the bodies 320. The biasing force of the biasing elements 322 then pulls the bodies 320 toward the hub ends 314 of the rods 318. This lowers the mass moment of inertia of the wheel 300, which makes it easier for the user to accelerate the wheel 300.

Figure 14B:
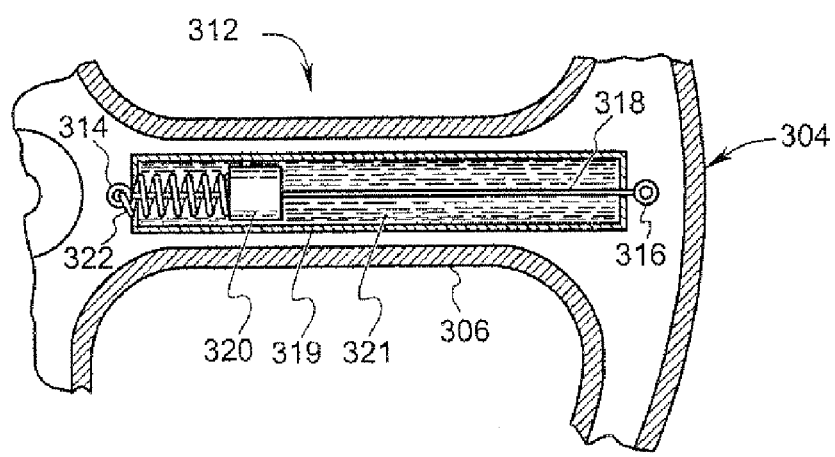

The response time of the momentum enhancing apparatus 312 may be slowed by placing each of the bodies 320 within a sealed tube 319 containing a viscous damping liquid 321, as shown in FIG. 14B. The user simply chooses the viscosity of the damping liquid 321 for the desired responsiveness of the momentum enhancing apparatus 312. A higher viscosity is associated with a slower responsiveness. In a particular embodiment, the damping liquid 321 may be a magnetorheological fluid (MRF), which has a viscosity that is dependent on the electromagnetic field applied to it. A simple circuit including a user-controlled switch or rheostat, a power source, and one or more electromagnets in proximity to the MRF may be utilized to selectively supply the electromagnetic field. Alternatively, a more complex circuit including a microprocessor may be utilized. Increasing the electromagnetic field applied to the MRF generally increases the viscosity of the MRF. Thus, the user may control the responsiveness of the momentum enhancing apparatus 312 by controlling the dynamic viscosity of the MRF. The user may also be able to lock the bodies 320 in a particular radial location by increasing the viscosity of the MRF until it behaves essentially like a solid. Alternatively, the circumference of the body 320 may be essentially the same as the internal diameter of the tube 319 so that the body 320 acts like a piston in an hydraulic cylinder, and the body 320 may be include a longitudinal borehole through which the damping liquid flows. A valve, such as one of the valves previously mentioned, may be employed to further regulate flow through the borehole.

In an alternative configuration shown in FIG. 15, the momentum enhancing apparatus 312 includes a biasing element 322', such as a coiled extension spring, that pushes against the body 320. The biasing element 322' tends to force the body 320 to move closer to the hub 302, lowering the minimum mass moment of inertia of the wheel 300 as compared to the embodiment having biasing element 322. However, the biasing element 322' limits the maximum mass moment of inertia because it is disposed between the body 320 and the end 316 of the rod 318, and thus limits the radially outward distance that the body 320 can achieve.

In a further alternative configuration shown in FIGS. 16A and 16B, the momentum enhancing apparatus 312 includes a ratcheting system to give the user further control of the apparatus. The ratcheting system includes a control band 348, a control piston 350, a control lever 352, and a control cable 354 between the control lever 352 and the control piston 350. The control band 348 may have a sawtooth shape, as best shown in FIG. 16C, to lock the body 320 in one radial direction while allowing it to move freely in the opposite radial direction. Alternatively, the control band 348 may lock the body 320 in a radial position with respect to both directions. The control band 348 may pivot toward and away from the rod 318, as indicated by the arrow A in FIG. 16B, such as by shifting a rotatable flange (not shown) coupled to the control band 348. The lever 352 selectively rotates the flange via the control cable 354 to move the control band 348 against the rod 318 to allow translation of the body 320 along the rod 318 and the band 348, or outward from the rod 318 to lock the body 320 against translation in one radial direction. She control piston 352 may be biased by a spring to take up slack in the control cable 354.

Figure 17:
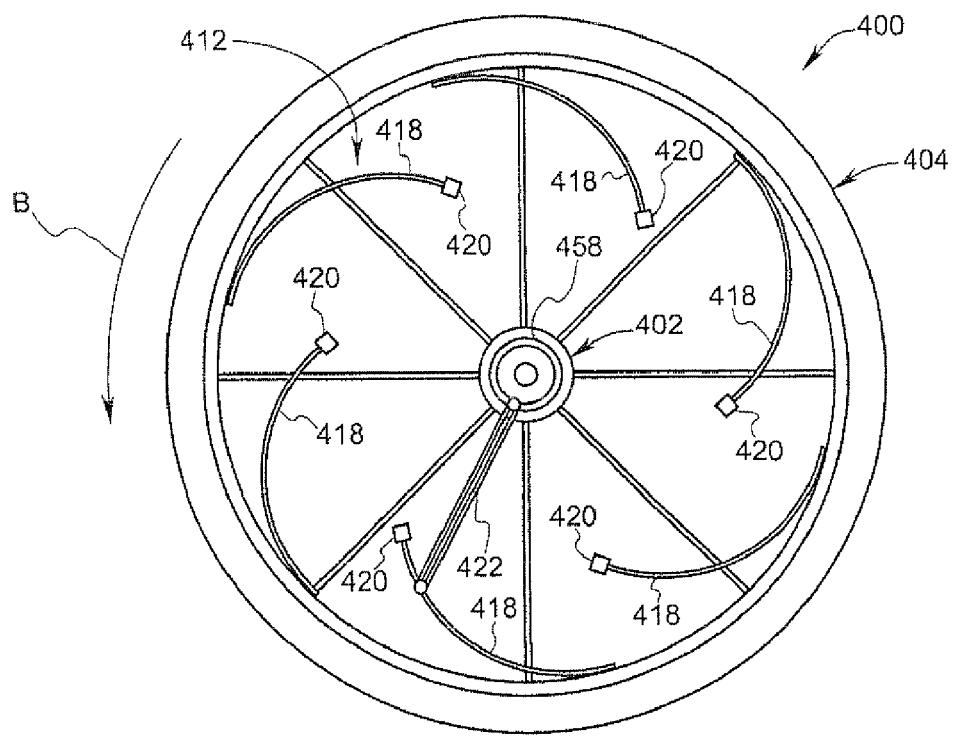
FIG. 17 is a side view of a schematic illustration of traction wheel having a momentum enhancing apparatus with solid bodies mounted on leaves or pivot arms.

In a preferred embodiment shown in FIG. 17, the wheel 400 includes a momentum enhancing apparatus 412 having a plurality of bodies 420 affixed to the peripheral portion 404 via flexible arms or leaves 418. In the configuration shown in FIG. 17, the direction of the rotation of the wheel 400 is indicated by arrow B. The bodies 420 and leaves 418 are evenly distributed about the hub 402 and may have an aerodynamic shape to reduce the impact of the momentum enhancing apparatus 412 on the wheel 400 or may be disposed within a covered disk where aerodynamics are not a consideration. Thus, the wheel 400 would benefit from containing the momentum enhancing apparatus 412 within full-disc wheels.

One end of each leaf 418 is affixed to the peripheral portion 404 and the other end is affixed to the associated body 420. Each leaf 418 is preferably fashioned of a flexible material, such as spring steel, with a bias toward the hub 402, to counteract centrifugal forces associated with low speeds. The bias may be enhanced with an optional elastic element 422 connected to either the leaf 418 or the body 420 and to the hub 402. The elastic element 422 may be attached to the hub 402 by a dial flange 458 with a pin lock. The pin lock is removed and the dial flange 458 is rotated to change the initial strain on the elastic band 422. Increasing the initial strain will increase the inward bias of the leaf 418.

In use, as the wheel 400 rotates, the centrifugal force on the bodies 420 overcomes the inward bias of the leaves 418 and the optional elastic elements 422, and the bodies 420 move toward the peripheral portion 404. This increases the mass moment of inertia of the wheel 400. Slowing of the wheel 400 decreases the centrifugal force on the bodies 420 and the inward bias forces the bodies 420 inward to decrease the mass moment of inertia of the wheel 400.

Figure 18:
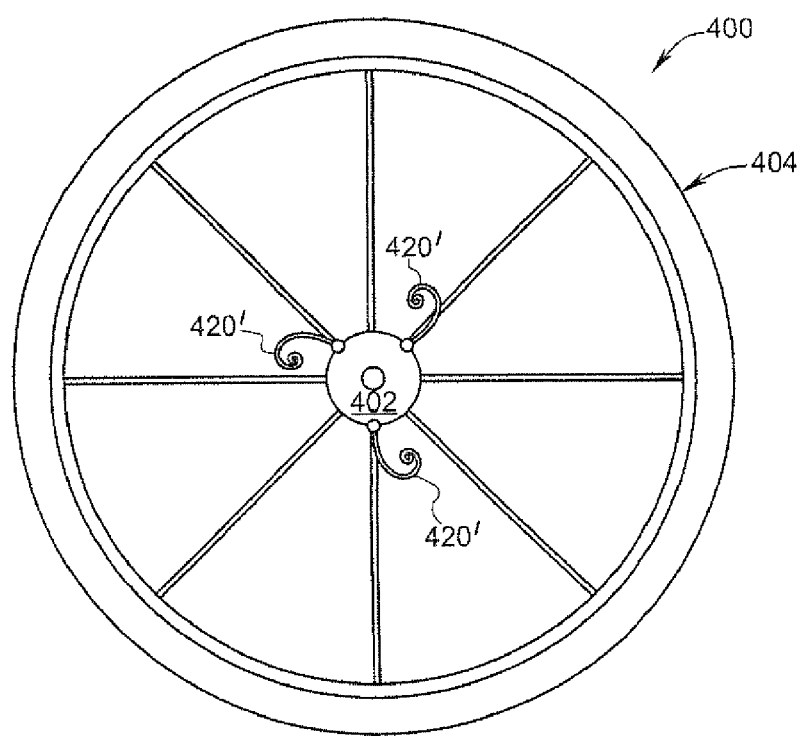
FIGS. 18-20 are side views of schematic illustrations of variations of the momentum enhancing apparatus shown in FIG. 17.

FIG. 18 shows a variation of the embodiment shown in FIG. 17 wherein the bodies 420' are curled leaf springs or spring-loaded chains attached to the hub 402. The spring-loaded chains 420' are biased into the curled position illustrated in the figure. The centrifugal force of the rotating wheel 400 overcomes the bias and straightens the chains 420' such that they extend more radially outward. Thus the center of mass of the chains moves away from the hub 402, increasing the mass moment of inertia of the wheel 400. When the wheel 400 encounters an increase in the load, the chains 420' transfer their momentum to the hub 402.

Figure 19:
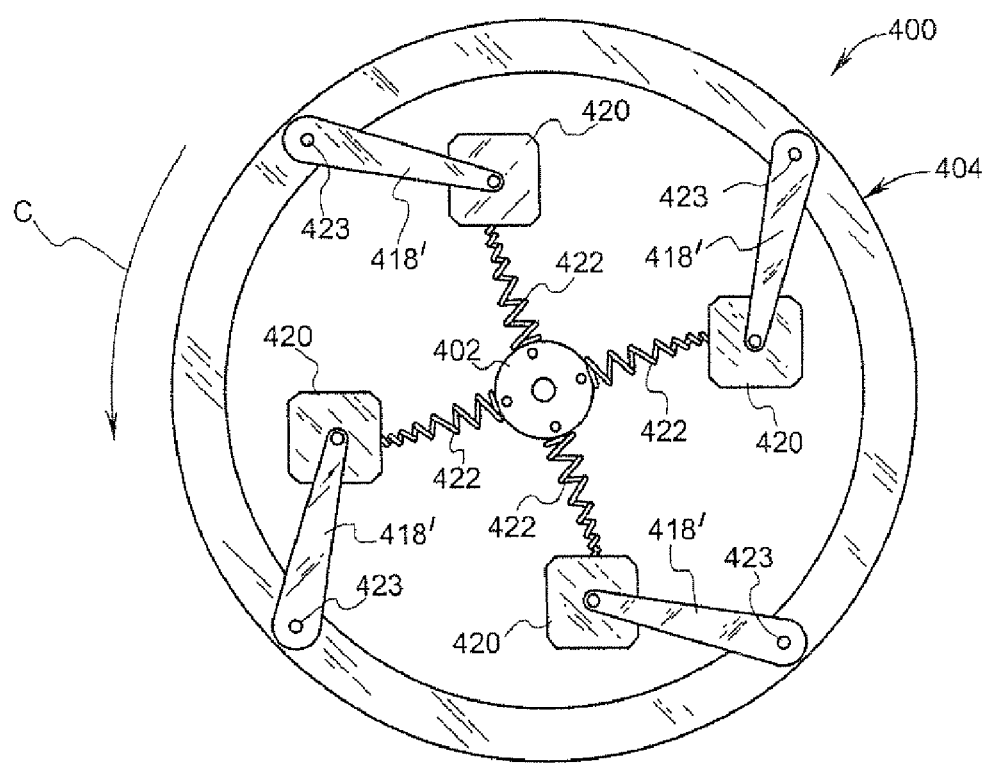

FIG. 19 shows an alternative configuration especially suited for motor-powered vehicles, the momentum enhancing apparatus 412 includes the body 420 with a more significant mass, a pivot arm 418', and a stronger biasing element 422, such as a compression spring. Each pivot arm 418' is connected to the peripheral portion 404 by a pivot pin or a hinge 423. Each biasing element 422 biases the body 420 toward the hub 402. The direction of rotation of the wheel 400 is indicated by arrow C. Because a motor-powered vehicle tends to travel at higher speeds (which generally correlate to higher angular velocities and greater centrifugal forces), it tends to experience higher drag than a human-powered vehicle, such as a bicycle. Therefore the larger mass bodies 420 are included in order to increase more dramatically the change in mass moment of inertia of the wheel 400 as the bodies 420 pivot radially in and out. Further, the rotational speeds of the wheels are likely significantly higher in a motor vehicle than in a human-powered vehicle. Thus, the biasing elements 422 are provided with a significantly higher spring force.

Figure 20:
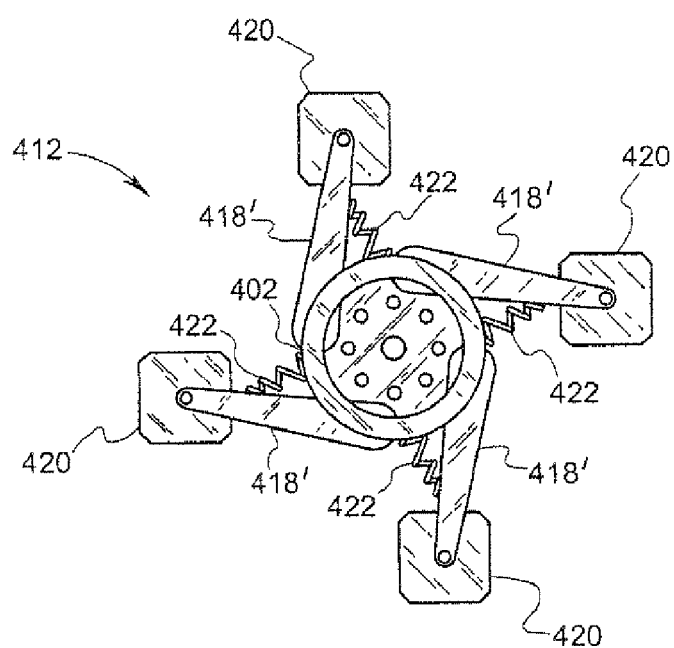

In a variation of the version of the wheel 400 described above, each pivot arm 418' is connected to the hub 402 by a pivot pin or a hinge, as shown by FIG. 20. This version is compact and easy to install; for example, the momentum enhancing apparatus 412 may be affixed to the distal end of the hub using bolts to secure the apparatus. However, this version transfers the momentum of the bodies 420 to the hub 402 via the pivot arms 418', increasing the strain on the hub.

In another variation of the version of the wheel 400 shown in FIG. 21, the bodies 420 are supported by a spider unit 418", which is attached to the drive shaft or hub 402 via several guide arms 460 and control arms 462. The guide arms 460 are fixed in position on the drive shaft, and the control arms 462 are slidably coupled to the drive shaft. A control flange 448, which is also slidably coupled to the drive shaft, is attached to the control arms 462 while a spring 456 is attached to the control flange 448. In the illustrated example, the spring 456 biases the control flange 448 and the control arms 462 away from the wheel 400, which brings the bodies 420 radially closer to the hub 402. As the centrifugal force of the rotating wheel overcomes the spring bias, the bodies 420 move away from the hub 402 to increase the mass moment of inertia of the wheel 400.

A control system may be included as an alternative to the spring 456, or in addition to the spring 456. Such a control system may include a control piston 450, a controller 452, and a control cable 454. The controller 452 may be hydraulic, mechanical, or motor-controlled. Further the controller 452 may be responsive to human input, a microprocessor, or a combination of both and may be responsive to a gyroscope, a bubble level, or other means for detecting a gradient or slope or the degree or magnitude of the slope upon which the wheel or associated vehicle is traveling. The controller 452 communicates with the piston 450 to translate the control flange 448, which, in turn, translates the control arms 462 of the spider unit 418. Thus, the controller 452 is able to adjust the radial position of the bodies 420 selectively to modify the mass moment of inertia of the wheel 400.

Friction, Fluid

Figure 24:
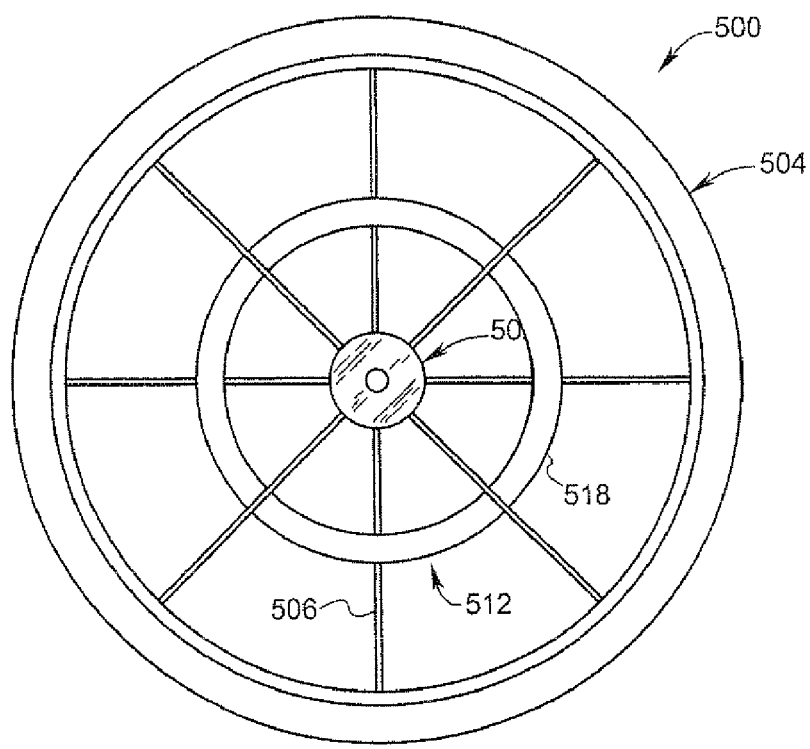
FIGS. 24 and 25 are side views of schematic illustrations of variations of the momentum enhancing apparatus shown in FIG. 22.

In a further alternative embodiment, the momentum enhancing apparatus gradually increases the angular velocity of a fluid to that of the remaining portion of the wheel and when the wheel encounters an increasing load, such as when transitioning from an inclined slope to a flat surface, the fluid transfers its momentum to the remaining portion of the wheel. FIG. 22 shows a wheel 500 having a hub 502, a peripheral portion 504, and supports or spokes 506. The momentum enhancing apparatus 512 includes a sealed annular tube 518 that is substantially concentric with the wheel 500 and is affixed to the wheel adjacent to and radially inward of the peripheral portion 504, or, alternatively, at a location radially intermediate between the hub 502 and the peripheral portion 504, as shown in FIG. 24. The tube 518 may be attached to the rim 508 or the spokes 506. The fluid 520 is sealed within the tube 518, but does not fill the tube, as shown in FIG. 22. The viscosity of the fluid 520 is chosen according to the responsiveness and the critical speed desired by the user. The internal diameter of the tube 518 may also be selected to regulate the fluid movement, since the boundary of the tube internal wall surface and the fluid will induce a friction that tends to move the fluid disposed near the boundary with the rotational movement of the tube internal wall surface. One or more vanes or ribs 526 may be included on the interior of the tube 518 to regulate movement of the fluid 520 with the tube 518. These vanes or ribs 526 may be similar to those described with reference to FIG. 4, and are preferably rigid, rather than flexible. Likewise the interior surface of the tube 518 may be dimpled or possess an otherwise irregular surface.

In use, the wheel 500 rotates in the direction indicated by arrow D. At relatively low angular velocities, gravity tends to overcome the frictional force on the fluid 520, and the fluid 520 tends not to rotate with the wheel 500. The fluid 520 is therefore essentially a static body at low angular velocities. As the wheel rotation increases, the fluid 520 is forced to spread against the inner wall of the tube 518 and the friction force between the fluid 520 and the inner wall overcomes gravity so that increasingly more of the fluid 520 rotates with the wheel 500. At sufficiently high speeds, all of the fluid 520 rotates with the tube 518 and coats the interior surface of the tube 518, generally at the radially outermost region of the tube 518. When the wheel 500 encounters a change in the load, the fluid 520 transfers its momentum to the wheel 500 either through frictional engagement with the interior surface of the tube 518 or via the ribs 526 within the tube 518. As the wheel 500 slows, gravity increasingly dominates and the fluid 520 becomes a static mass again.

Where the tube 518 is equipped with one or more vanes 526, the profile of each vane 526 affects the degree to which the fluid 520 is permitted to remain in a static state. Generally, the more the vanes 526 extend across or block the interior of the tube 518, the more they encourage the rotation of the fluid 520. The profile of the vanes 526 may be adjustable by fashioning the vanes 526 as paddles 527 that are pivotally installed in the wall of the tube 518 (FIGS. 23A and 23B). Turning the paddles 527 to be in-line with the direction of rotation (FIG. 23A) will tend to allow the fluid 520 to remain in a static state, where turning the paddles 527 to be transverse to the direction of rotation (FIG. 23B) will promote rotation of the fluid 520. Preferably the paddles 527 are rigid, but may also be flexible. The performance of the momentum enhancing apparatus 512 may also be adjusted by varying the amount and the viscosity of the fluid 520. For this purpose, an opening in the form of a threaded nozzle in communication with the interior of the tube 518 may be provided and a threaded cap or other closure device may permit the opening to be selectively opened or closed.

Figure 25:
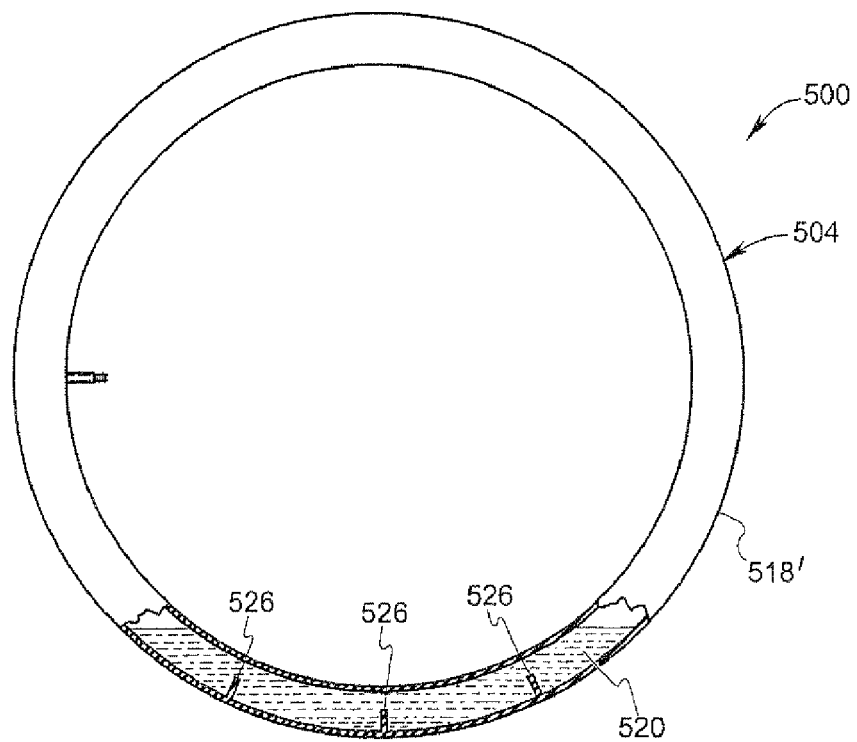

In an alternative version shown in FIG. 25, the momentum enhancing apparatus 512 is incorporated into an inner tube 518' of a pneumatic tire mounted on the periphery of a wheel. The inner tube 518' may include ribs 526.

Figure 26:
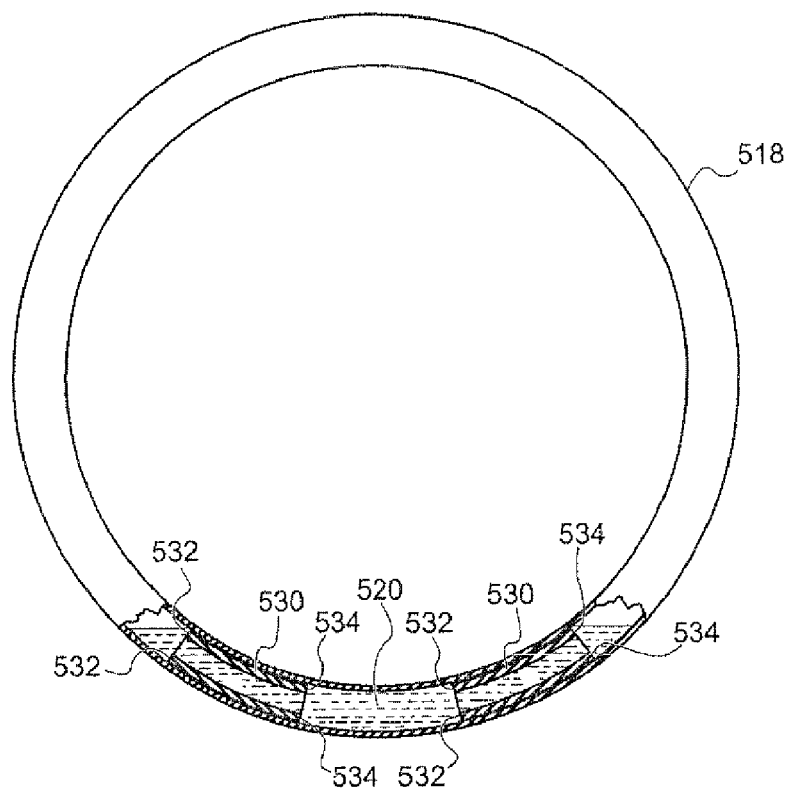
FIGS. 26-28 are side views of schematic illustrations of variations of the momentum enhancing apparatus shown in FIG. 25.

FIG. 26 shows an alternative tube construction which includes a tube 218 that may be similar to the tube 518 in FIG. 22. Disposed within the tube 518 preferably at equiangular locations are a series of tube segments 530 having an outer diameter that is preferably equal to the inner diameter of tube 518. The tube segments 530 may be affixed to the tube 518 by means such as an adhesive, or may be friction fit in a desired location within the tube 518. The lengths of each tube segment 530 as well as the spacing between adjacent tube segments 530 may be varied.

In one version of the embodiment shown in FIG. 26, each tube segment is essentially cylindrically shaped, the longitudinal ends 532, 534 of each tube segment 530 are blunt and perpendicular to the longitudinal axis of each tube segment 530, and the central, hollow interior possesses a preferably constant inner diameter. As the wheel rotates, the working fluid is permitted to flow through the central, hollow interior of each tube segment 530. Initially, the working fluid is settled by gravity in the vertically lowermost region of the tube 518, and as the wheel bearing the tube 518 begins to spin, the rotational movement of the tube segments 530 through the settled body of fluid encounters only relatively slight resistance due to the blunt longitudinal end pushing through the body. As the rotational velocity increases, the resistance also increases and tends to push the fluid farther around the tube 518 and more radially outward due to centrifugal effects. Further increase in the rotational velocity causes the fluid to reside and stay primarily in the radially outer regions between adjacent tube segments 530, so that substantially the entire body of fluid tends to rotate at the same rotational velocity as the tube 518 and its associated wheel. A reverse process occurs as the rotational velocity decreases, however, the momentum of the fluid will tend to maintain the higher rotational velocity as the wheel rotation decelerates.

The performance characteristics may be varied by selecting different fluid volumes and viscosities, different lengths and spacing of the tube segments 530, different internal diameters of the tube 518, and different internal diameters of the tube segments 530. It should also be appreciated that the performance characteristics may be modified by changing the profile of the longitudinal ends 532, 534 of each tube segment 530. It should further be appreciated that each tube segment 530 may comprise only a half-cylinder configuration, that is, a cylindrical tube segment split longitudinally in half, with a half-cylindrical segment disposed in the tube 518 so that the half-cylindrical segment is positioned most radially outward. The invention also contemplates that instead of there being a single passageway through or past each tube segment 530, there may be multiple passageways through which the working fluid may flow.

Figure 27:
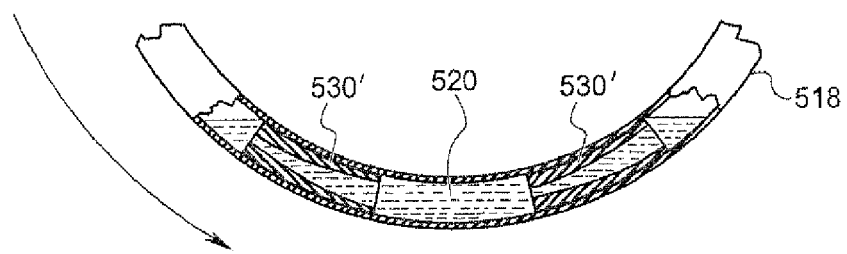

Because each longitudinal end 532, 534 of each tube segment 530 is blunted in the version shown in FIG. 26, and because the internal diameter throughout each tube segment 530 is constant, the resistance of the tube segments 530 moving through the working fluid 520 is approximately the same in either direction of rotation whereby a wheel employing the version drawn in FIG. 26 is approximately equally difficult to accelerate and decelerate. FIG. 27 shows another version of the momentum enhancing devices shown in FIGS. 22 and 26 in which each tube segment 530' possesses a conical or other tapered interior diameter, with the larger diameter end of the central, hollow interior being oriented with respect to the direction of wheel rotation as indicated by the arrow shown in FIG. 27. The taper may be constant at forty-five degrees, or at any other selected angle, or may be curved. Such a configuration of each tube segment helps facilitate relatively easy acceleration, but relatively difficult deceleration of the wheel.

Figure 28:
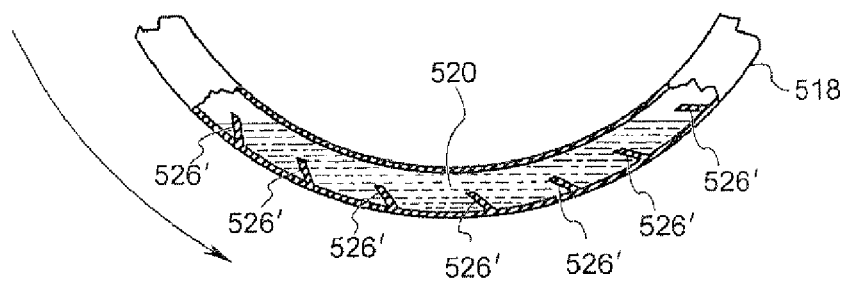
Figure 29A:
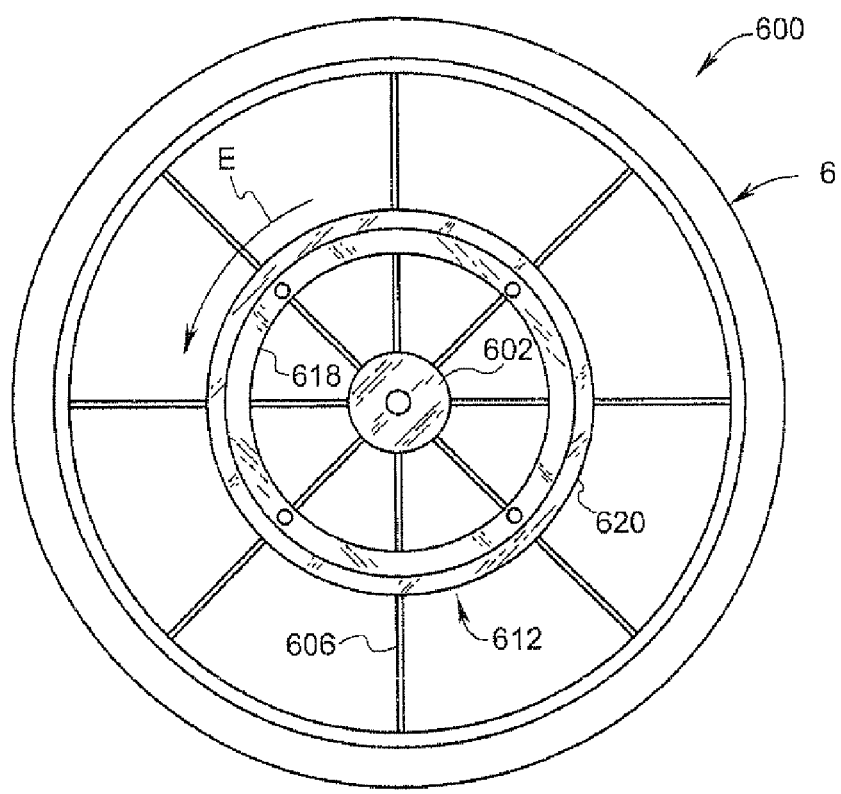
FIG. 29A is a side view of a schematic illustration of traction wheel having a friction momentum enhancing apparatus utilizing an annular body according to another embodiment of the invention.
Figure 29B:
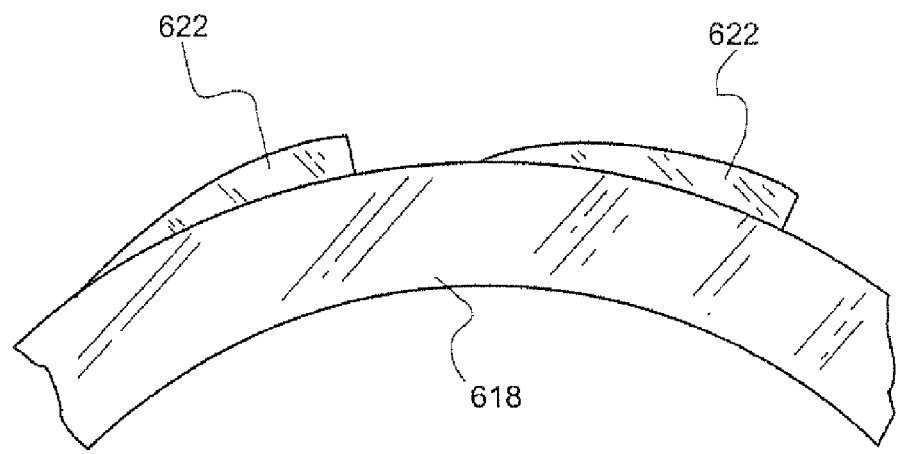
FIG. 29B is a side view of a schematic illustration of an extensible clutch mechanism that may be employed with the body shown in FIG. 29A.

FIG. 28 shows yet another version of the momentum enhancing devices depicted in FIGS. 22 and 25 in which the vanes or ribs 526' are angled with respect to the radius of the tube 518, such as at a forty-five degree angle, but which may be at any selected angle. The ribs 526' may extend at a variety of selected distances across the interior of the tube 518, and may have a variety of selected configurations, including rectangular, parallel side edges with a rounded, cupped or curved distal end, thumbnail, triangular, truncated triangular, hourglass, etc. As with the versions shown in FIG. 27, when the wheel is rotated in the direction indicated by the arrow shown in FIG. 28, the wheel is relatively easily accelerated, but relatively difficult to decelerate.

A rudimentary version of the device shown in FIG. 26 utilizes clear vinyl plastic tubing having an outer diameter of one and one-quarter inches and an internal diameter of one inch and bent in a circular configuration having a diameter of about seventeen inches for the tube 518', nine tube segments 530 equiangularly spaced within the plastic tubing and comprised of black plastic tubing having a length of about one-half inch and an outer diameter of one inch and an internal diameter of about five-eighths of an inch, and a working fluid comprising five ounces of water, with a plastic cable tie secured around the clear vinyl tubing over each segment of black tubing and squeezably clamping the two tubes together in a fixed relation.

A rudimentary version of the device shown in FIG. 28 utilizes the same clear vinyl plastic tubing described above with the ribs 526' fashioned by extending one-eighth inch wide cable ties through an incision in the wall of the clear vinyl plastic tubing at approximately a forty-five degree angle, with the ties staggered laterally with respect to adjacent ties, and using five ounces of water for the working fluid.

Friction, Solid

In another embodiment shown in FIG. 26, the wheel 600, including a hub 602, a peripheral portion 604, and supports/spokes 606, cooperates with a momentum enhancing apparatus 612) which utilizes the momentum of a floating annular disc or ring 620 to enhance the momentum of the wheel 600. The momentum enhancing apparatus 612 includes a support ring 618 attached to the spokes 606 at a location intermediate between the hub 602 and the peripheral portion 604. The support ring 618 is substantially concentric with the peripheral portion 604 of the wheel 600 and rotates with the wheel 600 in the direction indicated by the arrow E. The floating ring 620 may engage the support ring 618 via a bushing or a plurality of bearings.

Preferably one or both of the rings 618, 620 are provided with a selectively extensible clutch mechanism that is adapted to provide selective degrees of frictional engagement between the rings 618, 620. As shown in FIG. 26B, the support right 618 may include one or more selectively pivotable, radially extensible clutch members 622 that provide frictional contact with the opposing, inner wall of the floating ring 620. As the degree of extension is increased, the frictional force increases to the point where the rings 618, 620 will concurrently rotate at the same angular velocity, and as the clutch members become more retracted, the frictional force lessens so that the floating ring 620 rotates at an angular velocity slower than that of the support ring 618.

The surface contour of each clutch member 622 preferably is very gradually sloped, and may assume a "fish scale" profile, as shown in FIG. 26B. The outer surface of each clutch member 622 (and the opposing inner wall of the floating ring 620) may be fashioned of an extremely hard, abrasive material, of a rubber-like material, or of another material selected for the desired friction generating properties. The extension and retraction of the clutch members 620 may be operated through means of any of the controllers described with respect to other embodiments.

When the wheel 600 rotates (and the support ring 618 rotates with it), the floating ring 620 may rotate at a slower speed. However, when the wheel 600, and thus the support ring 618, begin to decrease in angular velocity below that of the solid ring 620, the clutch system may lock the floating ring 620 to the support ring 618 such that the floating ring 620 transfers its momentum to the support ring 618.

In use, as the wheel 600 travels, rotating in the direction of arrow E, the support ring 618 rotates with the wheel 600. The floating ring 620 may remain stationary or may rotate slower than the support ring 618. Friction between the support ring 618 and the floating ring 620 will cause the floating ring 620 to rotate faster. However, if the wheel 600 and support ring 618 slow to the angular velocity of the floating ring 620, the clutch system locks the floating ring 620 to the support ring 618 so the floating ring 620 transfers its angular momentum to the support ring 618 and, thus, to the wheel 600.

It should be appreciated the inventor contemplates momentum enhancing apparatus other than those described previously in detail. For example, a weight may be radially moved under selective activation of an electromagnetic force or under selective activation of a ratchet. In the former embodiment, for example, the weight could be mounted on a wire bike spoke or within a hollow bike spoke and the weight could be fashioned of a material responsive to a magnetic force. The operator of the vehicle could manipulate rheostat or another electronic switch to regulate the flow of electric current to an electromagnet mounted on the hub of the wheel to move the weight radially. In the latter embodiment, for example, a wire spoke of a wheel could be fitted with a series of teeth, a ratchet, and the weight could include a battery, a battery powered motor, a rotatable pin wheel that ridably engages the ratchet, a wireless receiver, and electronic circuitry that permits the battery to power the motor to rotate the pin wheel in either of two directions, thereby causing the weight to translate along the ratchet in either of two corresponding directions. The operator of the vehicle could manipulate a wireless transmitter to communicate through the wireless receiver to command the electronic circuitry to cause rotation of the pin wheel. The controller may also be provided with an audio recognition and responsive receiver and microprocessor so that the user may initiate controller command orally, such as by stating the words "out" or "in".

In those embodiments where the mass moves radially, the moment of inertia of a wheel rotating at a given angular velocity when the mass is its most radially inward as compared with the moment of inertia of a wheel rotating at the same angular velocity when the mass is radially extended may be defined as the degree or magnitude of alteration of the wheel's moment of inertia. In those embodiments where the mass moves at a angular velocity that may be different from the other parts of the wheel, the moment of inertia of the wheel rotating at a given angular velocity when the mass is rotating at the same angular velocity verses the moment of inertia of the wheel rotating at the same angular velocity when the mass is rotating at a different angular velocity may also be defined as the degree or magnitude of alteration of the wheel's moment of inertia.

The inventor contemplates that the mass moment of inertia of a wheel can be altered by a wide range of percentages, such as by up to at least 1%, at least 3%, at least 5%, at least 7%, at least 10%, at least 25%, at least 50%, at least 75%, or at least some other or higher percentage.

In those embodiments that employ a change in the radial disposition of the mass, it is believed that the invention will have the most drastic effect when the most radially inward position is as close to the axis of rotation as possible and when the most radial outward position is as close to the wheel periphery as possible, however, the invention contemplates the selection and use of different radial inwardmost and outermost positions. Similarly, in those embodiments where the mass is rotating at a different angular velocity than the remainder of the wheel, it is believed that the invention will have the most drastic effect when the mass is changed between a state of zero angular velocity and the same angular velocity as the remainder of the wheel, however, the invention also contemplates that the mass may have different extremes for its angular velocity relative to the remainder of the wheel.

The invention also contemplates that different embodiments may be used on the same wheel, preferably with like embodiments distributed equiangularly about the axis of rotation. Also, more than one embodiment or more than one of the same embodiment may be employed in the same spoke or other support structure. For example, two bodies such as those shown in FIG. 13D may be mounted on the same spoke, and attached to the hub with separate elastic bands, but with the radially outer body attached to the hub by a weaker elastic band, so that the radially outer body translates radially outward at a lower angular velocity than the radially inner body.

The invention also contemplates that where a plurality of momentum enhancing devices are used on the same wheel or on more than one wheel of a vehicle, then the radial displacement of the mass or the change in angular velocity of the mass relative to the remaining portion of the wheel may vary or be staggered between each momentum enhancing device. So, for example, if a single bicycle wheel employs eight bodies 266 as shown in FIG. 13D equiangularly arranged on wire spokes 252 of the wheel, then the elasticity of the associated elastic bands connecting each body 266 to the wheel hub may be varied such that four of the bodies 266 become essentially completely radially outwardly extended at a first, low angular velocity (such as ninety rpms) and the other four bodies 266 become essentially completely radially outwardly extended at a second, higher angular velocity (such as one hundred eighty rpms). The reverse process of the bodies 266 contracting radially inward at staggered angular velocities would also occur. In such an embodiment, the bodies 266 extending completely at the first angular velocity would preferably be equiangularly deployed as would the other bodies 266 that extend completely at the second angular velocity. Similarly, in the other embodiments employing fluids, for example, valves in each of the momentum enhancing devices may permit the fluid to flow radially outward at different, selected times or different angular velocities, or the viscosity of the fluid, the amount of the fluid, the size of the tube, and number and contour of the vanes may be varied to achieve a staggering effect. Moreover, in the embodiments shown in FIGS. 22 and 24, for example, a wheel may employ more than one circular tube, a plurality of tubes either arranged radially side-by-side or arranged concentrically. The viscosity of the fluid, the amount of the fluid, the size of the tube, and the number and size of the vanes and/or the actuation of the paddles may be varied to achieve a staggering effect.

The invention contemplates that the momentum enhancing device may be operatively coupled with a bubble level or other mechanism that indicates or measures deviation from a horizontal orientation, such that either the operator of a vehicle equipped with the momentum enhancing device may view the deviation and regulate the device accordingly or a controller responsive to the deviation mechanism may automatically regulate the device accordingly.

It is also noteworthy that the masses may be forced radially outward in order to assist in decelerating or braking a vehicle. So, for example, an automobile may be provided with a device that senses a depression of a brake pedal and automatically activates an electromagnet that forces the masses radially outward, thereby assisting in the braking function. Such a device may also be conditioned to respond only when the brake pedal is depressed faster than a certain triggering speed or more than a certain triggering distance or only when the vehicle is traveling below or above a certain threshold speed or traveling within a selected speed range.

While the invention has been described with reference to preferred embodiments, it will be understood by those skilled in the art that various changes may be made and equivalents may be substituted for elements thereof to adapt to particular situations without departing from the scope of the invention. Therefore, it is intended that the invention not be limited to the particular embodiments disclosed as the best mode contemplated for carrying out this invention, but that the invention will include all embodiments falling within the scope and spirit of the appended claims.

The invention claimed is:

1. A wheel adapted to provide locomotive traction while in contact with a surface, said wheel including a hollow interior including a series of hollow segments, said hollow segments are each adapted for storing and transferring a fluid to other said segments, said storing and transferring said fluid modifies a mass moment of inertia of said wheel when said wheel is accelerating or decelerating while rotating.

2. The wheel of claim 1, wherein said storing and transferring of said fluid automatically modifies said mass moment of inertia of said wheel as a function of the angular velocity of said wheel.

3. The wheel of claim 1, wherein said storing and transferring of said fluid selectively modifies the mass moment of inertia of said wheel.

4. The wheel of claim 1, wherein said storing and transferring of said fluid tends to maintain the mass moment of inertia when said wheel is rotationally decelerating.

5. The wheel of claim 1 wherein said storing and transferring of said fluid is adapted to modify the magnitude of the wheel's mass moment of inertia by up to at least about seven percent.

6. The wheel of claim 1, wherein said storing and transferring of said fluid is adapted to modify the magnitude of the wheel's moment of inertia by up to at least about forty percent.

7. The wheel of claim 1 wherein said storing and transferring of said fluid is adapted to modify the magnitude of the wheel's moment of inertia by up to at least about twenty-five percent.

8. A traction wheel having a variable mass moment of inertia, the traction wheel including:
   a traction wheel including solid components and a fluid component;
   said solid components including a circular shaped body having a hollow interior including a series of hollow segments adapted for storing and transferring a fluid component; and
   wherein said hollow segments providing a means for altering an angular velocity of said circular shaped body of said wheel while said wheel is rotating.

9. The traction wheel of claim 8, wherein said altering means is capable of altering said angular velocity of said body relative to an alternative angular velocity of said body when said body is otherwise absent of said fluid component.

10. The traction wheel of claim 8, wherein said body rotates about an axis of rotation, and wherein said altering means includes a tube that is substantially concentric about said axis and that encloses said fluid component.

11. The traction wheel of claim 10, wherein said tube is partially filled with said fluid.

12. The traction wheel of claim 8, wherein said body rotates about an axis of rotation, and includes a floating ring disposed substantially concentric with said axis, and wherein said altering means includes a support ring disposed substantially concentric with said axis.

13. The traction wheel of claim 12, wherein said altering means further includes means for inducing said floating ring to rotate concurrently with said support rings.

* * * * *